United States Patent [19]
Rhoads

[11] Patent Number: 6,122,392
[45] Date of Patent: *Sep. 19, 2000

[54] SIGNAL PROCESSING TO HIDE PLURAL-BIT INFORMATION IN IMAGE, VIDEO, AND AUDIO DATA

[75] Inventor: Geoffrey B. Rhoads, West Linn, Oreg.

[73] Assignee: Digimarc Corporation, Tualatin, Oreg.

[ * ] Notice: This patent is subject to a terminal disclaimer.

[21] Appl. No.: 08/967,693

[22] Filed: Nov. 12, 1997

Related U.S. Application Data

[63] Continuation of application No. 08/614,521, Mar. 15, 1996, Pat. No. 5,745,604, which is a continuation of application No. 08/215,289, Mar. 17, 1994, abandoned, which is a continuation-in-part of application No. 08/154,866, Nov. 18, 1993, abandoned.

[51] Int. Cl.[7] ........................................ G06K 9/00
[52] U.S. Cl. ............................. 382/100; 382/232
[58] Field of Search .................... 382/100, 115, 382/232

[56] References Cited

U.S. PATENT DOCUMENTS

| | | |
|---|---|---|
| 3,493,674 | 2/1970 | Houghton . |
| 3,569,619 | 3/1971 | Simjian . |
| 3,576,369 | 4/1971 | Wick et al. ................ 355/132 |
| 3,585,290 | 6/1971 | Sanford . |

(List continued on next page.)

FOREIGN PATENT DOCUMENTS

| | | |
|---|---|---|
| 366381 A2 | 10/1989 | European Pat. Off. . |
| 372 601 | 6/1990 | European Pat. Off. . |
| 411 232 | 2/1991 | European Pat. Off. . |
| 418 964 A1 | 3/1991 | European Pat. Off. . |
| 441 702 | 8/1991 | European Pat. Off. . |
| 493 091 | 7/1992 | European Pat. Off. . |
| 058 482 | 8/1992 | European Pat. Off. . |
| 551 016 | 7/1993 | European Pat. Off. . |
| 581 317 | 2/1994 | European Pat. Off. . |
| 605 208 | 7/1994 | European Pat. Off. . |
| 629 972 | 12/1994 | European Pat. Off. . |
| 649 074 | 4/1995 | European Pat. Off. . |
| 650 146 | 4/1995 | European Pat. Off. . |
| 705 025 | 4/1996 | European Pat. Off. . |
| 3806411 | 9/1989 | Germany . |
| 4-248771 | 2/1992 | Japan . |
| 5/242217 | 9/1993 | Japan . |
| 8-30759 | 2/1996 | Japan . |
| 2063018 | 5/1981 | United Kingdom . |
| 2067871 | 7/1981 | United Kingdom . |
| 2196167 | 4/1988 | United Kingdom . |
| 2204984 | 11/1988 | United Kingdom . |
| WO 89/08915 | 9/1989 | WIPO . |
| WO 93/25038 | 12/1993 | WIPO . |
| WO 95/10835 | 4/1995 | WIPO . |
| WO 95/14289 | 5/1995 | WIPO . |
| WO 95/20291 | 7/1995 | WIPO . |
| WO 96/26494 | 8/1996 | WIPO . |
| WO 96/27259 | 9/1996 | WIPO . |

OTHER PUBLICATIONS

Komatsu et al., "A Proposal on Digital Watermark in Document Image Communication and Its Application to Realizing a Signature," *Electronics and Communications in Japan*, Part 1, vol. 73, No. 5, 1990, pp. 22–33.

*Primary Examiner*—Bhavesh Mehta
*Attorney, Agent, or Firm*—William Y. Conwell

[57] ABSTRACT

An identification code signal is impressed on a carrier to be identified (such as an electronic data signal or a physical medium) in a manner that permits the identification signal later to be statistically discerned and the carrier thereby identified. The method and apparatus are characterized by robustness despite degradation of the encoded carrier, and by holographic permeation of the identification signal throughout the carrier.

27 Claims, 3 Drawing Sheets

U.S. PATENT DOCUMENTS

| | | |
|---|---|---|
| 3,655,162 | 4/1972 | Yamamoto et al. . |
| 3,703,628 | 11/1972 | Philipson, Jr. . |
| 3,805,238 | 4/1974 | Rothfjell . |
| 3,809,806 | 5/1974 | Walker et al. . |
| 3,838,444 | 9/1974 | Loughlin et al. . |
| 3,914,877 | 10/1975 | Hines . |
| 3,922,074 | 11/1975 | Ikegami et al. . |
| 3,971,917 | 7/1976 | Maddox et al. . |
| 3,977,785 | 8/1976 | Harris ................................ 355/133 |
| 3,982,064 | 9/1976 | Barnaby . |
| 3,984,624 | 10/1976 | Waggener . |
| 4,025,851 | 5/1977 | Haselwood et al. . |
| 4,184,700 | 1/1980 | Greenaway .......................... 283/6 |
| 4,225,967 | 9/1980 | Miwa et al. . |
| 4,230,990 | 10/1980 | Lert, Jr. et al. . |
| 4,231,113 | 10/1980 | Blasbalg . |
| 4,238,849 | 12/1980 | Gassmann . |
| 4,252,995 | 2/1981 | Schmidt et al. . |
| 4,262,329 | 4/1981 | Bright et al. . |
| 4,313,197 | 1/1982 | Maxemchuk . |
| 4,367,488 | 1/1983 | Leventer et al. . |
| 4,379,947 | 4/1983 | Warner . |
| 4,380,027 | 4/1983 | Leventer et al. . |
| 4,389,671 | 6/1983 | Posner et al. . |
| 4,395,600 | 7/1983 | Lundy et al. . |
| 4,416,001 | 11/1983 | Ackerman ............................ 369/44 |
| 4,423,415 | 12/1983 | Goldman . |
| 4,425,661 | 1/1984 | Moses et al. . |
| 4,476,468 | 10/1984 | Goldman . |
| 4,523,508 | 6/1985 | Ruell . |
| 4,528,588 | 7/1985 | Löfberg . |
| 4,547,804 | 10/1985 | Greenberg . |
| 4,553,261 | 11/1985 | Froessl . |
| 4,590,366 | 5/1986 | Rothfjell . |
| 4,595,950 | 6/1986 | Löfberg . |
| 4,637,051 | 1/1987 | Clark . |
| 4,639,779 | 1/1987 | Greenberg . |
| 4,647,974 | 3/1987 | Butler et al. . |
| 4,654,867 | 3/1987 | Labedz et al. . |
| 4,660,221 | 4/1987 | Dlugos . |
| 4,663,518 | 5/1987 | Borror et al. . |
| 4,665,431 | 5/1987 | Cooper . |
| 4,672,605 | 6/1987 | Hustig et al. . |
| 4,675,746 | 6/1987 | Tetrick et al. . |
| 4,677,435 | 6/1987 | Cause D'Agraives et al. . |
| 4,682,794 | 7/1987 | Margolin . |
| 4,703,476 | 10/1987 | Howard . |
| 4,712,103 | 12/1987 | Gotanda . |
| 4,718,106 | 1/1988 | Weinblatt . |
| 4,723,149 | 2/1988 | Harada ................................ 355/133 |
| 4,739,377 | 4/1988 | Allen . |
| 4,750,173 | 6/1988 | Blüthgen . |
| 4,765,656 | 8/1988 | Becker et al. . |
| 4,775,901 | 10/1988 | Nakano . |
| 4,776,013 | 10/1988 | Kafri et al. . |
| 4,805,020 | 2/1989 | Greenberg . |
| 4,807,031 | 2/1989 | Broughton et al. . |
| 4,811,357 | 3/1989 | Betts et al. . |
| 4,811,408 | 3/1989 | Goldman . |
| 4,820,912 | 4/1989 | Samyn . |
| 4,835,517 | 5/1989 | van der Gracht et al. . |
| 4,855,827 | 8/1989 | Best . |
| 4,864,618 | 9/1989 | Wright et al. . |
| 4,866,771 | 9/1989 | Bain . |
| 4,874,936 | 10/1989 | Chandler et al. . |
| 4,876,617 | 10/1989 | Best et al. . |
| 4,879,747 | 11/1989 | Leighton et al. . |
| 4,884,139 | 11/1989 | Pommier . |
| 4,885,632 | 12/1989 | Mabey et al. . |
| 4,903,301 | 2/1990 | Kondo et al. . |
| 4,908,836 | 3/1990 | Rushforth et al. . |
| 4,908,873 | 3/1990 | Philibert et al. . |
| 4,918,484 | 4/1990 | Ujiie et al. ............................ 355/41 |
| 4,920,503 | 4/1990 | Cook . |
| 4,921,278 | 5/1990 | Shiang et al. . |
| 4,939,515 | 7/1990 | Adelson . |
| 4,941,150 | 7/1990 | Iwasaki . |
| 4,943,973 | 7/1990 | Werner . |
| 4,943,976 | 7/1990 | Ishigaki . |
| 4,944,036 | 7/1990 | Hyatt . |
| 4,963,998 | 10/1990 | Maufe . |
| 4,965,827 | 10/1990 | McDonald . |
| 4,967,273 | 10/1990 | Greenberg . |
| 4,969,041 | 11/1990 | O'Grady et al. . |
| 4,972,471 | 11/1990 | Gross et al. . |
| 4,972,475 | 11/1990 | Sant'Anselmo ...................... 380/54 |
| 4,972,476 | 11/1990 | Nathans . |
| 4,979,210 | 12/1990 | Nagata et al. . |
| 4,993,068 | 2/1991 | Piosenka . |
| 4,996,530 | 2/1991 | Hilton . |
| 5,003,590 | 3/1991 | Lechner et al. ........................ 380/5 |
| 5,010,405 | 4/1991 | Schreiber et al. . |
| 5,027,401 | 6/1991 | Soltesz . |
| 5,034,982 | 7/1991 | Heninger et al. .................... 380/54 |
| 5,036,513 | 7/1991 | Greenblatt . |
| 5,063,446 | 11/1991 | Gibson . |
| 5,073,899 | 12/1991 | Collier et al. . |
| 5,073,925 | 12/1991 | Nagata et al. ........................ 380/3 |
| 5,075,773 | 12/1991 | Pullen et al. . |
| 5,077,608 | 12/1991 | Dubner . |
| 5,077,795 | 12/1991 | Rourke et al. . |
| 5,079,648 | 1/1992 | Maufe . |
| 5,091,966 | 2/1992 | Bloomberg et al. . |
| 5,095,196 | 3/1992 | Miyata . |
| 5,113,437 | 5/1992 | Best . |
| 5,128,525 | 7/1992 | Stearns et al. . |
| 5,144,660 | 9/1992 | Rose . |
| 5,148,498 | 9/1992 | Resnikoff et al. . |
| 5,150,409 | 9/1992 | Elsner . |
| 5,161,210 | 11/1992 | Druyvesteyn et al. . |
| 5,166,676 | 11/1992 | Milheiser . |
| 5,168,146 | 12/1992 | Bloomberg . |
| 5,181,786 | 1/1993 | Hujink . |
| 5,185,736 | 2/1993 | Tyrrell et al. . |
| 5,199,081 | 3/1993 | Saito et al. . |
| 5,200,822 | 4/1993 | Bronfin et al. . |
| 5,212,551 | 5/1993 | Conanan . |
| 5,213,337 | 5/1993 | Sherman . |
| 5,228,056 | 7/1993 | Schilling . |
| 5,243,423 | 9/1993 | DeJean et al. . |
| 5,245,165 | 9/1993 | Zhang . |
| 5,245,329 | 9/1993 | Gokcebay . |
| 5,247,364 | 9/1993 | Banker et al. . |
| 5,253,078 | 10/1993 | Balkanski et al. . |
| 5,257,119 | 10/1993 | Funada et al. . |
| 5,259,025 | 11/1993 | Monroe . |
| 5,267,334 | 11/1993 | Normille et al. . |
| 5,280,537 | 1/1994 | Sugiyama et al. . |
| 5,293,399 | 3/1994 | Hefti . |
| 5,295,203 | 3/1994 | Krause et al. . |
| 5,299,019 | 3/1994 | Pack et al. . |
| 5,305,400 | 4/1994 | Butera . |
| 5,315,098 | 5/1994 | Tow . |
| 5,319,453 | 6/1994 | Copriviza et al. . |
| 5,319,724 | 6/1994 | Blonstein et al. . |
| 5,319,735 | 6/1994 | Preuss et al. . |
| 5,325,167 | 6/1994 | Melen . |
| 5,327,237 | 7/1994 | Gerdes et al. . |
| 5,337,361 | 8/1994 | Wang et al. .......................... 380/51 |
| 5,337,362 | 8/1994 | Gormish et al. . |
| 5,349,655 | 9/1994 | Mann . |
| 5,351,302 | 9/1994 | Leighton et al. . |

| | | | |
|---|---|---|---|
| 5,371,792 | 12/1994 | Asai et al. ................................. | 380/3 |
| 5,379,345 | 1/1995 | Greenberg . | |
| 5,387,941 | 2/1995 | Montgomery et al. . | |
| 5,394,274 | 2/1995 | Kahn . | |
| 5,396,559 | 3/1995 | McGrew . | |
| 5,398,283 | 3/1995 | Virga . | |
| 5,404,160 | 4/1995 | Schober et al. . | |
| 5,404,377 | 4/1995 | Moses . | |
| 5,408,542 | 4/1995 | Callahan . | |
| 5,418,853 | 5/1995 | Kanota et al. . | |
| 5,422,963 | 6/1995 | Chen et al. . | |
| 5,422,995 | 6/1995 | Aoki et al. . | |
| 5,425,100 | 6/1995 | Thomas et al. . | |
| 5,428,606 | 6/1995 | Moskowitz . | |
| 5,428,607 | 6/1995 | Hiller et al. . | |
| 5,432,542 | 7/1995 | Thibadeau et al. . | |
| 5,432,870 | 7/1995 | Schwartz . | |
| 5,446,273 | 8/1995 | Leslie . | |
| 5,450,122 | 9/1995 | Keene . | |
| 5,450,490 | 9/1995 | Jensen et al. . | |
| 5,461,426 | 10/1995 | Limberg et al. . | |
| 5,469,506 | 11/1995 | Berson et al. . | |
| 5,473,631 | 12/1995 | Moses . | |
| 5,479,168 | 12/1995 | Johnson et al. . | |
| 5,481,294 | 1/1996 | Thomas et al. . | |
| 5,488,664 | 1/1996 | Shamir . | |
| 5,499,294 | 3/1996 | Friedman . | |
| 5,515,081 | 5/1996 | Vasilik . | |
| 5,524,933 | 6/1996 | Kunt et al. . | |
| 5,530,751 | 6/1996 | Morris ....................................... | 380/4 |
| 5,530,759 | 6/1996 | Braudaway et al. . | |
| 5,532,920 | 7/1996 | Hartrick et al. . | |
| 5,537,223 | 7/1996 | Curry . | |
| 5,539,471 | 7/1996 | Myhrvold et al. . | |
| 5,539,735 | 7/1996 | Moskowitz . | |
| 5,541,662 | 7/1996 | Adams et al. . | |
| 5,541,741 | 7/1996 | Suzuki . | |
| 5,544,255 | 8/1996 | Smithies et al. . | |
| 5,548,646 | 8/1996 | Aziz et al. . | |
| 5,557,333 | 9/1996 | Jungo et al. . | |
| 5,559,559 | 9/1996 | Jungo et al. . | |
| 5,568,179 | 10/1996 | Diehl et al. . | |
| 5,568,570 | 10/1996 | Rabbani . | |
| 5,572,010 | 11/1996 | Petrie . | |
| 5,572,247 | 11/1996 | Montgomery . | |
| 5,576,532 | 11/1996 | Hecht . | |
| 5,579,124 | 11/1996 | Aijala et al. . | |
| 5,582,103 | 12/1996 | Tanaka et al. . | |
| 5,587,743 | 12/1996 | Montgomery . | |
| 5,590,197 | 12/1996 | Chen et al. . | |
| 5,602,920 | 2/1997 | Bestler et al. . | |
| 5,606,609 | 2/1997 | Houser et al. . | |
| 5,611,575 | 3/1997 | Petrie . | |
| 5,613,004 | 3/1997 | Cooperman et al. . | |
| 5,613,012 | 3/1997 | Hoffman et al. . | |
| 5,614,940 | 3/1997 | Cobbley et al. . | |
| 5,617,148 | 4/1997 | Montgomery . | |
| 5,629,770 | 5/1997 | Brassil . | |
| 5,629,980 | 5/1997 | Stefik et al. . | |
| 5,638,443 | 6/1997 | Stefik et al. . | |
| 5,638,446 | 6/1997 | Rubin . | |
| 5,646,997 | 7/1997 | Barton . | |
| 5,652,626 | 7/1997 | Kawakami et al. ..................... | 348/463 |
| 5,659,726 | 8/1997 | Sandford, II et al. . | |
| 5,661,574 | 8/1997 | Kawana . | |
| 5,664,018 | 9/1997 | Leighton . | |
| 5,666,487 | 9/1997 | Goodman et al. . | |
| 5,721,788 | 2/1998 | Powell et al. ........................... | 382/100 |

OTHER PUBLICATIONS

Schneier, "Digital Signatures, Cryptographic Algorithms Can Create Nonforgeable Signatures for Electronic Documents, Making Them Valid Legal Instruments" *BYTE,* Nov. 1993, pp. 309–312.

Komatsu et al., "Authentication System Using Concealed Image in Telematics," *Memoirs of the School of Science & Engineering,* Waseda Univ., No. 52, 1988, pp. 45–60.

Machado, "Announcing Stego 1.0a2, The First Steganography Tool for the Macintosh," Internet reference, Nov. 28, 1993, 3 pages.

Arachelian, "White Noise Storm," Apr. 11, 1994, Internet reference, 13 pages.

Brown, "S–Tools for Windows, Version 1.00, © 1994 Andy Brown, What is Steganography," Internet reference, Mar. 6, 1994, 6 pages.

shaggy@phantom.com, "Hide and Seek v. 4.0," Internet reference, Apr. 10, 1994, 3 pages.

Wise, "The History of Copyright, Photographers' Rights Span Three Centuries," *Photo>Electronic Imaging,* vol. 37, No. 6, 1994.

Kassam, *Signal Detection in Non–Gaussian Noise,* Dowden & Culver, 1988, pp. 1–96.

Brassil et al., Electronic Marking and Identification Techniques to Discourage Document Copying, *Proceedings of INFOCOM '94 Conference on Computer, IEEE Commun. Soc Conference,* Jun. 12–16, 1994, pp. 1278–1287.

Jain, "Image Coding Via a Nearest Neighbors Image Model," *IEEE Transactions on Communications,* vol. COM–23, No. 3, Mar. 1975, pp. 318–331.

Arthur, "Digital Fingerprints Protect Artwork," *New Scientist,* Nov. 12, 1994, p. 24.

Matthews, "When Seeing is Not Believing," *New Scientist,* Oct. 16, 1993, pp. 13–15.

Bender et al., "Techniques for Data Hiding," Massachusetts Institute of Technology, Media Laboratory, Jan. 1995, 10 pages.

Walton, "Image Authentication for a Slippery New Age," *Dr. Dobb's Journal,* Apr. 1995, pp. 18–26, 82–87.

Port, "Halting Highway Robbery on the Internet," *Business Week,* Oct. 17, 1994, p. 212.

"Foiling Card Forgers With Magnetic 'Noise,'" *Wall Street Journal,* Feb. 8, 1994.

Fitzgerald, "Invisible Digital Copyright ID," *Editor & Publisher,* Jun. 25, 1994, p. 62.

van Schyndel et al., "A Digital Watermark," *IEEE International Conference on Image Processing,* Nov. 13–16, 1994, pp. 86–90.

Matsui et al., "Video–Steganography: How to Secretly Embed a Signature in a Picture," *IMA Intellectual Property Project Proceedings,* Jan. 1994, vol. 1, Issue 1, pp. 187–205.

Tanaka et al., "Embedding Secret Information Into a Dithered Multi–Level Image," *Proc. IEEE Military Comm. Conf.,* Sep. 1990, pp. 216–220.

Tanaka et al., "New Integrated Coding Schemes for Computer–Aided Facsimile," *Proc. IEEE Int'l Conf. on Sys. Integration,* Apr. 1990, pp. 275–281.

Schreiber et al., "A Compatible High–Definition Television System Using the Noise–Margin Method of Hiding Enhancement Information," *SMPTE Journal,* Dec. 1989, pp. 873–879.

Short, "Steps Toward Unmasking Secure Communications," *International Journal of Bifurcation and Chaos,* vol. 4, No. 4, 1994, pp. 959–977.

Tanaka, "Embedding the Attribute Information Into a Dithered Image," *Systems and Computers in Japan,* vol. 21, No. 7, 1990, pp. 43–50.

Nakamura et al., "A Unified Coding Method of Dithered Image and Text Data Using Micropatterns," *Electronics and Communications in Japan,* Part 1, vol. 72, No. 4, 1989, pp. 50–56.

Simmons, "Subliminal Channels; Past and Present," *ETT,* vol. 5, No. 4, Jul.–Aug. 1994, pp. 45–59.

Nakamura et al., "A Unified Coding Method of Image and Text Data Using Discrete Orthogonal Transform," *Systems and Computers in Japan,* vol. 21, No. 3, 1990, pp. 87–92.

Tanaka et al., "A Visual Retrieval System with Private Information for Image Database," *Proceeding International Conference on DSP Applications and Technology,* Oct. 1991, 00. 415–421.

Sapwater et al., "Electronic Copyright Protection," *Photo>Electronic Imaging,* vol. 37, No. 6, 1994, pp. 16–21.

JPEG Group's JPEG Software (release 4), FTP.CSU-A.BEREKELEY.EDU/PUB/CYPHERPUNKS/APPLICATIONS/ JSTEG/JPEG.ANNOUNCEMENT.GZ.

Caronni, "Assuring Ownership Rights for Digital Images," Published in the Proceedings of 'Reliable IT Systems,' VIS '95, HH. Brüggemann and W. Gerhardt–Häckl (Ed.), Vieweg Publishing Company, Germany, 1995, Jun. 14, 1994, 10 pages.

Tirkel et al, "Electronic Water Mark," DICTA–93, Macquarie University, Sydney, Australia, Dec., 1993, pp. 666–673.

Koch et al., "Copyright Protection for Multimedia Data," Proc. of the International Conference on Digital Media and Electronic Publishing, Dec. 6–8, 1994, Leeds, U.K., 15 pages.

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

Boneh, "Collusion–Secure Fingerprinting for Digital Data," Department of Computer Science, Princeton University, 1995, 31 pages.

Burgett et al., "A Novel Method for Copyright Labeling Digitized Image Data," requested by e–mail from author (unavailable/password protected on IGD WWW site); received Sep. 18, 1995, 12 pages.

Friedman, "The Trustworthy Digital Camera: Restoring Credibility to the Photographic Image," IEEE Transactions on Consumer Electronics, vol. 39, No. 4, Nov., 1993, pp. 905–910.

"Cyphertech Systems: Introduces Digital Encoding Device to Prevent TV Piracy," *Hollywood Reporter,* Oct. 20, 1993, p. 23.

"NAB—Cyphertech Starts Anti–Piracy Broadcast Tests," *Newsbytes,* NEW03230023, Mar. 23, 1994.

Humphrey, "Stamping Out Crime," *Hollywood Reporter,"* Jan. 26, 1994, p. S48.

Koch et al., "Towards Robust and Hidden Image Copyright Labeling," *Proc. of 22995 IEEE Workshop on Nonlinear Signal and Image Processing,* Jun. 20–22, 1995, 4 pages.

"Copyright Protection for Digital Images, Digital Fingerprinting from FBI," Highwater FBI brochure, 1995, 4 pages.

"High Water FBI Limited Presentation Image Copyright Protection Software," FBI Ltd brochure, Jul., 1995, 17 pages.

Boland et al, "Watermarking Digital Images for Copyright Protection," Fifth International Conference on Image Processing and its Applications, Conference Date Jul. 4–6, 1995, Conf. Publ. No. 410, p. 326–330.

"Steganography," *Intellectual Property and the National Information Infrastructure The Report of the Working Group on Intellectual Property Rights,* Sep. 1995, pp. 212–213.

Caruso, "Digital Commerce, 2 plans for watermarks, which can bind proof of authorship to electronic works." *New York Times,* Aug. 7, 1995, one page.

"Holographic signatures for digital images," *The Seybold Report on Desktop Publishing,* Aug. 1995, one page.

Clarke, "Invisible Code Tags Electronic Images," *Electronic Engineering Times,* Jun. 12, 1995, n. 852, p. 42.

"The Copyright Can of Worms Opened Up By The New Electronic Media," *Computergram Internations,* pCGN07170006, Jul. 17, 1995 and "The Copyright Can of Worms Opened Up By the New Electronic Media—2," *Computergram Internations,* pCGN07210008, Jul. 21, 1995, 3 pages total.

"Access Control and COpyright Protection for Images, WorkPackage 1: Access Control and Copyright Protection for Images Need Evaluation," Jun., 1995, 21 pages.

"Access Control and COpyright Protection for Images, Conditional Access and Copyright Protection Based on the Use of Trusted Third Parties," 1995, 43 pages.

Luc, "Analysis of Spread Spectrum System Parameters for Design of Hidden Transmission," *Radioengineering,* vol. 4, No. 2, Jun. 1995, pp. 26–29.

Macq, "Cryptology for Digital TV Broadcasting," *Proceedings of the IEEE,* vol. 83, No. 6, Jun. 1995, pp. 944–957.

Zhao et al., "Embedding Robust Labels Into Images for Copyright Protection," *Proc. of the International Congress on Intellectual Property Rights for Specialized Information, Knowledge and New Technologies* (Vienna, Austria) Aug. 21–25, 1995, 10 pages.

Frequently Asked Questions About Digimarc Signature Technology, Aug. 1, 1995, HTTP://WWW.DIGIMARC.COM, 9 pages.

Bender et al, "Techniques for Data Hiding," Draft Preprint, Private Correspondence, dated Oct. 30, 1995.

Johhnson, "Steganography," Dec. 10, 1995, 32 pages.

Aura, "Invisible Communication," Helskinki University of Technology, Digital Systems Laboratory, Nov. 5, 1995, 13 pages.

Cox et al., "Secure Spread Spectrum Watermarking for Multimedia," NEC Research Institute Technical Report, Dec. 5, 1995, 33 pages.

Digimarc presentation at RSA Conference, approximately Jan. 17, 1996, 4 pages.

Hecht, "Embedded Data Glyph Technology for Hardcopy Digital Documents," SPIE vol. 2171, Feb. 1994, pp. 341–352.

Roberts, "Picture Coding Using Pseudorandom Noise," IRE Trans. on Information Theory, vol. 8, No. 2, Feb., 1962, pp. 145–154.

Choudhury, et al., "Copyright Protection for Electronic Publishing over Computer Networks," *IEEE Network Magazine,* Jun. 1994, 18 pages.

Möller, et al., "Rechnergestutzte Steganographie: Wie sie Funktioniert und warum folglich jede Reglementierung von Verschlusselung unsinnig ist," *DuD, Datenschutz und Datensicherung,* Jun. 18, 1994 318–326.

Pennebaker et al., *JPEG Still Image Data Compression Standard,* Chapter 3, "Aspects of the Human Visual System," pp. 23–27, 1993, Van Nostrand Reinhold, New York.

Castro et al., "Registration of Translated and Rotated Images Using Finite Fourier Transforms," *IEEE Transactions on Pattern Analysis and Machine Intelligence,* vol. PAMI–9, No. 5, Sep. 1987, pp. 700–703.

Weber et al., "Correlative Image Registration," *Seminars in Nuclear Medicine,* vol. XXIV, No. 4 Oct., 1994, pp. 311–323.

Toga et al., "Registration Revisited," *Journal of Neuroscience Methods,* 48 (1993), pp. 1–13.

Sheng et al., "Experiments on Pattern Recognition Using Invariant Fourier–Mellin Descriptors," *Journal of Optical Society of America,* vol. 3, No. 6, Jun., 1986, pp. 771–776.

Kurak et al., "A Cautionary Note On Image Downgrading," 1992 IEEE, pp. 153–159.

Wagner, "Fingerprinting," 1983 IEEE, pp. 18–22.

Sandford II, et al., "The Data Embedding Method," SPIE vol. 2615, Oct. 23, 1995, pp. 226–259.

Brassil et al., "Hiding Information in Document Images," Nov., 1995, 7 pages.

Pitas et al., "Applying Signatures on Digital Images," IEEE Workshop on Nonlinear Image and Signal Processing, Neos Marmaras, Greece, pp. 460–463, Jun., 1995.

Koch et al., "Digital Copyright Labeling: Providing Evidence of Misuse and Tracking Unauthorized Distribution of Copyrighted Materials," Oasis Magazine, Dec. 1995, 3 pages.

Rindfrey, "Towards an Equitable System for Access Control and Copyright Protection in Broadcast Image Services: The Equicrypt Approach," *Intellectual Property Rights and New Technologies,* Proc. of the Conference, R. Oldenbourg Verlag Wien München 1995, 12 pages.

Boney et al., "Digital Watermarks for Audio Signals," Proceedings of Multimedia '96, 1996 IEEE, PP. 473–480.

Boucqueau et al., Equitable Conditional Access and Copyright Protection for Image Based on Trusted Third Parties, *Teleservices & Multimedia Communications, 2nd Int. Cost 237 Workshop,* Second International Cost 237 Workshop, Nov., 1995; published 1996, pp. 229–243.

Delaigle et al., "Digital Watermarking," Proc. SPIE—Int. Soc. Opt. Eng., vol. 2659, pp. 99–110, 1996.

Dautzenberg, "Watermarking Images," Department of Microelectronics and Electrical Engineering, Trinity College Dublin, 47 pages, Oct. 1994.

van Schyndel et al., "Towards a Robust Digital Watermark," ACCV '95, vol. 2, Dec., 1995, pp. 504–508.

New Product Information, "FBI at AppleExpo" (Olympia, London), Nov., 1995, 2 pages.

ORuanaidh et al, "Watermarking Digital Images for Copyright Protection," http://www.kalman.mee.tcd.ie/people/jjr/eva_pap.html, Feb. 2, 1996, 8 pages. (Also published Aug., 1996, IEE Proceedings–Vision, Image and Signal Processing, vol. 143, no. 4, pp. 250–256.).

DICE Digital Watermark System, Q&A, Dec., 1995, 12 pages.

Ohnishi et al., Embedding a Seal into a Picture Under Orthogonal Wavelet Transform, Proceedings of Multimedia '96, 1996, IEEE, pp. 514–421.

Arazi, et al., "Intuition, Perception, and Secure Communication," IEEE Transactionson Systems, Man, and Cybernetics, vol. 19, No. 5, Sep./Oct. 1989, pp. 1016–1020.

Bruyndonckx et al., "Spatial Method for Copyright Labeling of Digital Images," 1994, 6 pages.

"Watermarking & Digital Signature: Protect Your Work!" Published on Internet 1996, http://Itswww.epfl.ch/~jordan/watermarking.html.

Gabor, et al., "Theory of Communication," J. Inst. Elect. Eng. 93, 1946, pp. 429–441.

Bruyndonckx et al., Neural Network Post–Processing of Coded Images Using Perceptual Masking, 1994, 3 pages.

Pickholtz et al., "Theory of Spread–Spectrum Communications—A Tutorial," Transactions on Communications, vol. COM–30, No. 5, May, 1982, pp. 855–884.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

Tirkel et al., "A Two–Dimensional Digital Watermark," 1995, 6 pages.

Delaigle et al., "A Psychovisual Approach for Digital Picture Watermarking," 1995, 20 pages.

Fimmerstad, "The Virtual Art Museum," Ericsson Connexion, Dec., 1995, pp. 29–31.

Mintzer et al., "Toward on–line, Worldwide Access to Vatican Library Materials," IBM J. Res. Develop. vol. 40 No. 2, Mar., 1996, pp. 139–162.

Hartung et al., Digital Watermarking of Raw and Compressed Video, Proc. SPIE 2952, Digital Compression Technologies and Systems for Video Communications, Oct., 1996, pp 205–213.

Cox et al., "A Secure, Imperceptible Yet Perceptually Salient, Spread Spectrum Watermark for Multimedia," IEEE, Southcon/96, Conference Record, Pp. 192–197, 1996.

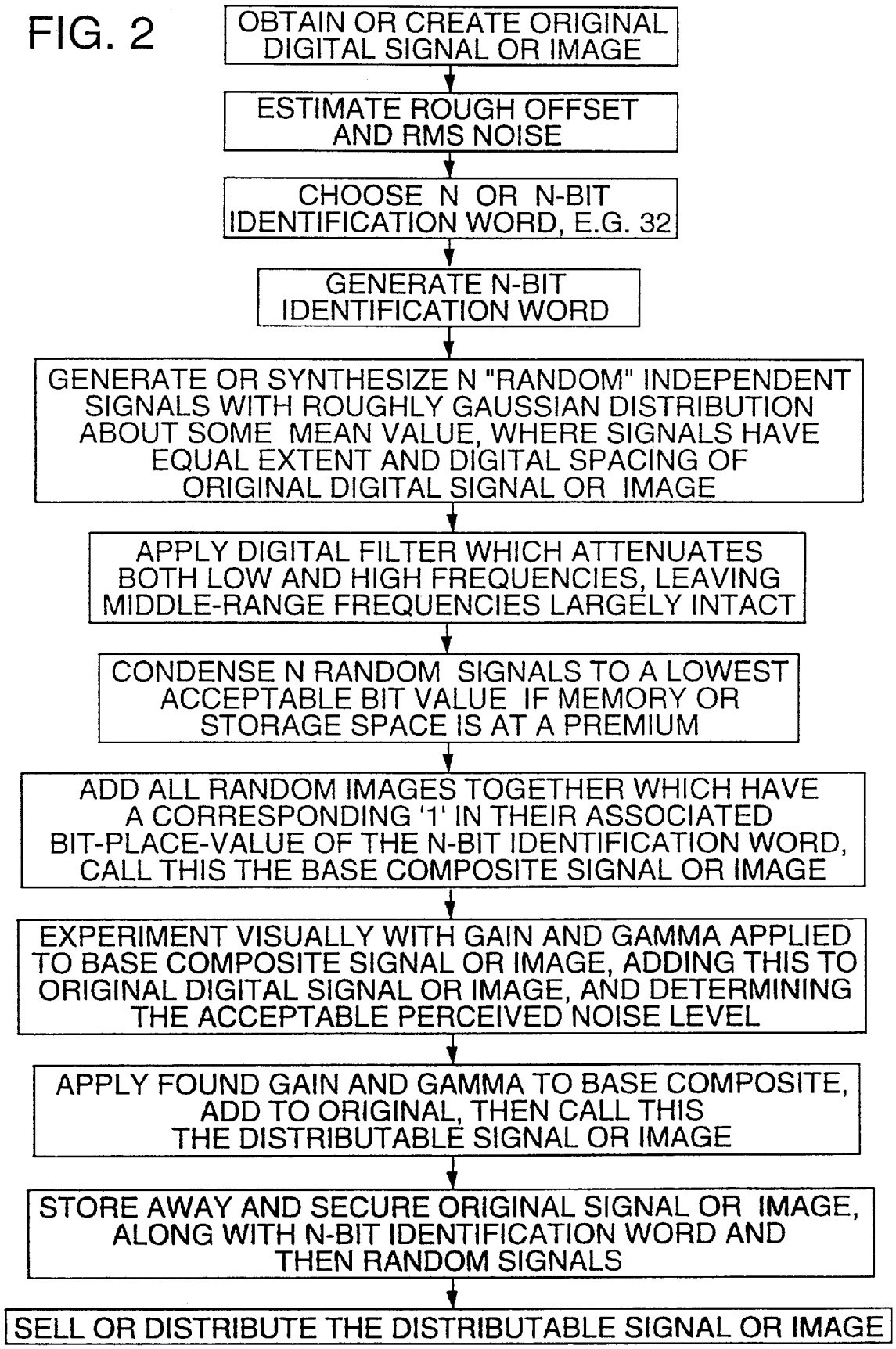

SIGNAL PROCESSING TO HIDE PLURAL-BIT INFORMATION IN IMAGE, VIDEO, AND AUDIO DATA

RELATED APPLICATION DATA

The present application is a continuation application Ser. No. 08/614,521, filed Mar. 15, 1996 (now U.S. Pat. No. 5,745,604), which is a continuation of application Ser. No. 08/215,289 filed Mar. 17, 1994 (abandoned), which is a continiuation-in-part of application Ser. No. 08/154,866, filed Nov. 18, 1993 (abandoned).

A microfiche appendix, comprising one microfiche, with a total of 21 printed pages of computer program listings, forms part of this specifications.

FIELD OF THE INVENTION

The present invention relates to the embedding of robust identification codes in electronic, optical and physical media, and the subsequent, objective discernment of such codes for identification purposes even after intervening distortion or corruption of the media.

The invention is illustrated with reference to a few exemplary applications, including electronic imagery, emulsion film, and paper currency, but is not so limited.

BACKGROUND AND SUMMARY OF THE INVENTION

"would never put it in the power of any printer or publisher to suppress or alter a work of mine, by making him master of the copy"
Thomas Paine, *Rights of Man*, 1792.
"The printer dares not go beyond his licensed copy"
Milton, *Aeropagetica*, 1644.

Since time immemorial, unauthorized use and outright piracy of audio and visual source material has caused lost revenues to the owners of such material, and has been a source of confuision and corruption of original work.

With the advent of digitizing data audio signals and images, the technology of copying materials and redistributing them in an unauthorized manner has reached new heights of sophistication, and more importantly, omnipresence. Lacking objective means for comparing an alleged copy of material with the original, owners and possible litigation proceedings are left with a subjective opinion of whether the alleged copy is stolen, or has been used in an unauthorized manner. Furthermore, there is no simple means of tracing a path to an original purchaser of the material, something which can be valuable in tracing where a possible "leak" of the material first occurred.

A variety of methods for protecting commercial material have been attempted. One is to scramble signals via an encoding method prior to distribution, and descramble prior to use. This technique, however, requires that both the original and later descrambled signals never leave closed and controlled networks, lest they be intercepted and recorded. Furthermore, this arrangement is of little use in the broad field of mass marketing audio and visual material, where even a few dollars extra cost causes a major reduction in market, and where the signal must eventually be descrambled to be perceived and thus can be easily recorded.

Another class of techniques relies on modification of source audio or video signals to include a subliminal identification signal, which can be sensed by electronic means. Examples of such systems are found in U.S. Pat. No. 4,972,471 and European patent publication EP 441,702, as well as in Komatsu et al, "Authentication System Using Concealed Image in Telematics," Memoirs of the School of Science & Engineering, Waseda University, No. 52, p. 45–60 (1988) (Komatsu uses the term "digital watermark" for this technique). An elementary introduction to these methods is found in the article "Digital Signatures," Byte Magazine, November, 1993, p. 309. These techniques have the common characteristic that deterministic signals with well defined patterns and sequences within the source material convey the identification information. For certain applications this is not a drawback. But in general, this is a highly inefficient form of embedding identification information for a variety of reasons: (a) the whole of the source material is not used; (b) deterministic patterns have a higher likelihood of being discovered and removed by a would-be infringer; and (c) the signals are not generally 'holographic' in that identifications may be difficult to make given only sections of the whole. ('Holographic' is used herein to refer to the property that the identification information is distributed globally throughout the coded signal, and can be fully discerned from an examination of even a fraction of the coded signal. Coding of this type is sometimes termed "distributed" herein.)

What is needed is a reliable and efficient method for performing a positive identification between a copy of an original signal and the original. This method should not only be able to perform positive identification, it should also be able to relate version identification of sold copies in order to better pinpoint the point of sale. The method should not compromise the innate quality of material which is being sold, as does the placement of localized logos on images. The method should be robust so that an identification can be made even after multiple copies have been made and/or compression and decompression of the signal has taken place. The identification method should be largely uneraseable or "uncrackable." The method should be capable of working even on fractional pieces of the original signal, such as a 10 second "riff" of an audio signal or the "clipped and pasted" sub-section of an original image.

The existence of such a method would have profound consequences on audio and image piracy in that it could (a) cost effectively monitor for unauthorized uses of material and perform "quick checks"; (b) become a deterrent to unauthorized uses when the method is known to be in use and the consequences well publicized; and (c) provide unequivocal proof of identity, similar to fingerprint identification, in litigation, with potentially more reliability than that of fingerprinting.

In accordance with an exemplary embodiment of the invention, a computer system is provided with associated means for manipulating either digital audio signals or digital images.

In cases where original material is in "non-digital" form, such as on audio tape or on a photograph, means for creating a high fidelity digital copy of the material is included in the illustrative embodiment. This physical system will be referred to as the "Eye-D" workstation or system which serves as a concise trade name. The Eye-D system embeds an imperceptible global signal either directly onto the digital original or onto the "digitized copy" of the original if it was in a non-digital form to begin with. The new copy with the embedded signal becomes the material which is sold while the original is secured in a safe place. The new copy will be nearly identical to the original except under the finest of scrutiny; thus, its commercial value will not be compromised. After the new copy has been sold and distributed and potentially distorted by multiple copies, the present disclosure details a method for positively identifying any suspect signal against the original.

It is the use of identification signals which are global (holographic) and which mimic natural noise sources which are two important inter-related features which distinguish the present invention from the collective prior art. This approach allows the maximization of identification signal energy as opposed to merely having it present 'somewhere in the original material.' This allows it to be much more robust in the face of thousands of real world degradation processes and material transformations such as cutting and cropping of imagery.

The foregoing and additional features and advantages of the present invention will be more readily apparent from the following detailed description thereof, which proceeds with reference to the accompanying drawings.

BRIEF DESCRIPTION OF THE DRAWINGS

FIG. 2 is a general overview, with detailed description of steps, of the process of embedding an "imperceptible" identification signal onto another signal.

DETAILED DESCRIPTION

In the following discussion of an illustrative embodiment, the words "signal" and "image" are used interchangeably to refer to both one, two, and even beyond two dimensions of digital signal. Examples will routinely switch back and forth between a one dimensional audio-type digital signal and a two dimensional image-type digital signal.

Figure 1:
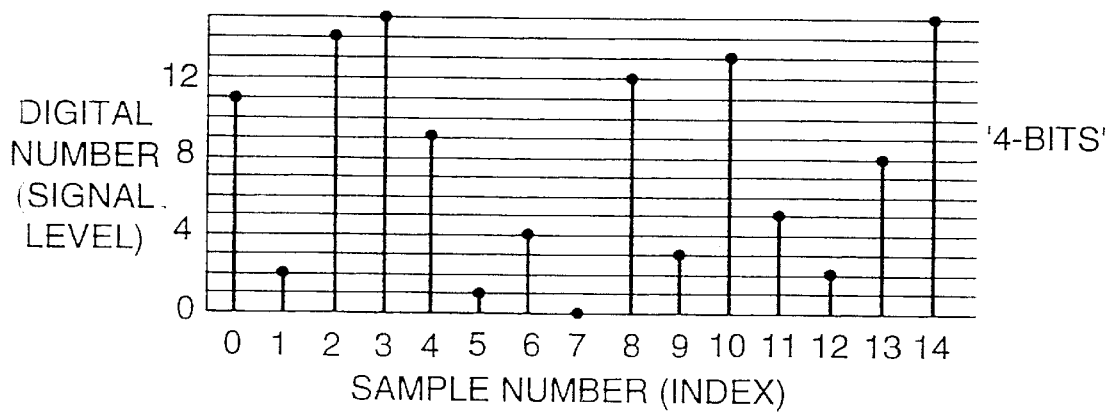
FIG. 1 is a simple and classic depiction of a one dimensional digital signal which is discretized in both axes.

In order to fully describe the details of an illustrative embodiment of the invention, it is necessary first to describe the basic properties of a digital signal. FIG. 1 shows a classic representation of a one dimensional digital signal. The x-axis defines the index numbers of sequence of digital "samples," and the y-axis is the instantaneous value of the signal at that sample, being constrained to exist only at a finite number of levels defined as the "binary depth" of a digital sample. The example depicted in FIG. 1 has the value of 2 to the fourth power, or "4 bits," giving 16 allowed states of the sample value.

For audio information such as sound waves, it is commonly accepted that the digitization process discretizes a continuous phenomena both in the time domain and in the signal level domain. As such, the process of digitization itself introduces a fundamental error source in that it cannot record detail smaller than the discretization interval in either domain.

The industry has referred to this, among other ways, as "aliasing" in the time domain, and "quantization noise" in the signal level domain. Thus, there will always be a basic error floor of a digital signal. Pure quantization noise, measured in a root mean square sense, is theoretically known to have the value of one over the square root of twelve, or about 0.29 DN, where DN stands for 'Digital Number' or the finest unit increment of the signal level.

For example, a perfect 12 bit digitizer will have 4096 allowed DN with an innate root mean square noise floor of 0.29 DN.

All known physical measurement processes add additional noise to the transformation of a continuous signal into the digital form. The quantization noise typically adds in quadrature (square root of the mean squares) to the "analog noise" of the measurement process, as it is sometimes referred to.

With almost all commercial and technical processes, the use of the decibel scale is used as a measure of signal and noise in a given recording medium. The expression "signal-to-noise ratio" is generally used, as it will be in this disclosure. As an example, this disclosure refers to signal to noise ratios in terms of signal power and noise power, thus 20 dB represents a 10 times increase in signal amplitude.

In summary, the presently preferred embodiment of the invention embeds an N-bit value onto an entire signal through the addition of a very low amplitude encodation signal which has the look and characteristics of pure noise. N is usually at least 8 and is capped on the higher end by ultimate signal-to-noise considerations and "bit error" in retrieving and decoding the N-bit value. As a practical matter, N is chosen based on application specific considerations, such as the number of unique different "signatures" that are desired. To illustrate, if N=128, then the number of unique digital signatures is in excess of $10^{\wedge\wedge}38$ ($2^{\wedge\wedge}128$). This number is believed to be more than adequate to both identify the material with sufficient statistical certainty o to index exact sale and distribution information.

The amplitude or power of this added signal is determined by the aesthetic and informational considerations of each and every application using the Eye-D method. For instance, non-professional video can stand to have a higher embedded signal level without becoming noticeable to the average human eye, while very high precision audio may only be able to accept a relatively small signal level lest the human ear perceive an objectionable increase in "hiss." These statements are generalities and each application has its own set of criteria in choosing the signal level of the embedded identification signal. The higher the level of embedded signal, the more corrupted a copy can be and still be identified. On the other hand, the higher the level of embedded signal, the more objectionable the perceived noise might be, potentially impacting the value of the distributed material.

A definition of terms is now in order:

The original signal refers to either the original digital signal or the high quality digitized copy of a non-digital original.

The N-bit identification word refers to a unique identification binary value, typically having N range anywhere from 8 to 128, which is the identification code ultimately placed onto the original signal via the disclosed transformation process. In the preferred embodiment, each N-bit identification word begins with the sequence of values '0101,' which is used to determine an optimization of the signal-to-noise ratio in the identification procedure of a suspect signal (see definition below).

The m'th bit value of the N-bit identification word is either a zero or one corresponding to the value of the m'th place, reading left to right, of the N-bit word. E.g., the first (m=1) bit value of the N=8 identification word 01110100 is the value '0;' the second bit value of this identification word is '1', etc.

The m'th individual embedded code signal refers to a signal which has dimensions and extent precisely equal to the original signal (e.g. both are a 512 by 512 digital image), and which is (in the illustrated embodiment) an independent pseudo-random sequence of digital values. "Pseudo" pays homage to the difficulty in philosophically defining pure randomness, and also indicates that there are various acceptable ways of generating the "random" signal. There will be exactly N individual embedded code signals associated with any given original signal.

The acceptable perceived noise level refers to an application-specific determination of how much "extra noise," i.e. amplitude of the composite embedded code signal described next, can be added to the original signal and still have an acceptable signal to sell or otherwise distribute. This disclosure uses a 1 Db increase in noise as a typical value which might be acceptable, but this is quite arbitrary.

The composite embedded code signal refers to the signal which has dimensions and extent precisely equal to the original signal, (e.g. both are a 512 by 512 digital image), and which contains the addition and appropriate attenuation of the N individual embedded code signals. The individual embedded signals are generated on an arbitrary scale, whereas the amplitude of the composite signal must not exceed the pre-set acceptable perceived noise level, hence the need for "attenuation" of the N added individual code signals.

The distributable signal refers to the nearly similar copy of the original signal, consisting of the original signal plus the composite embedded code signal. This is the signal which is distributed to the outside community, having only slightly higher but acceptable "noise properties" than the original.

A suspect signal refers to a signal which has the general appearance of the original and distributed signal and whose potential identification match to the original is being questioned. The suspect signal is then applied to the decoding process of Eye-D to see if it matches the N-bit identification word.

The detailed methodology of the preferred embodiment begins by stating that the N-bit identification word is encoded onto the original signal by having each of the m bit values multiply their corresponding individual embedded code signals, the resultant being accumulated in the composite signal, the fully summed composite signal then being attenuated down to the acceptable perceived noise amplitude, and the resultant composite signal added to the original to become the distributable signal.

The original signal, the N-bit identification word, and all N individual embedded code signals are then stored away in a secured place. A suspect signal is then found. This signal may have undergone multiple copies, compressions and decompressions, resamplings onto different spaced digital signals, transfers from digital to analog back to digital media, or any combination of these items. IF the signal still appears similar to the original, i.e. its innate quality is not thoroughly destroyed by all of these transformations and noise additions, then depending on the signal to noise properties of the embedded signal, the identification process should function to some objective degree of statistical confidence. The extent of corruption of the suspect signal and the original acceptable perceived noise level are two key parameters in determining an expected confidence level of identification.

The identification process on the suspected signal begins by resampling and aligning the suspected signal onto the digital format and extent of the original signal. Thus, if an image has been reduced by a factor of two, it needs to be digitally enlarged by that same factor. Likewise, if a piece of music has been "cut out," but may still have the same sampling rate as the original, it is necessary to register this cut-out piece to the original, typically done by performing a local digital cross-correlation of the two signals (a common digital operation), finding at what delay value the correlation peaks, then using this found delay value to register the cut piece to a segment of the original.

Once the suspect signal has been sample-spacing matched and registered to the original, the signal levels of the suspect signal must be matched in an rms sense to the signal level of the original. This can be done via a search on the parameters of offset, amplification, and gamma being optimized by using the minimum of the mean squared error between the two signals as a function of the three parameters. We can call the suspect signal normalized and registered at this point, or just normalized for convenience.

The newly matched pair then has the original signal subtracted from the normalized suspect signal to produce a difference signal. The difference signal is then cross-orrelated with each of the N individual embedded code signals and the peak cross-correlation value recorded. The first four bit code ('0101') is used as a calibrator both on the mean values of the zero value and the one value, and on further registration of the two signals if a finer signal to noise ratio is desired (i.e., the optimal separation of the 0101 signal will indicate an optimal registration of the two signals and will also indicate the probable existence of the N-bit identification signal being present.)

The resulting peak cross-correlation values will form a noisy series of floating point numbers which can be transformed into 0's and 1's by their proximity to the mean values of 0 and 1 found by the 0101 calibration sequence. If the suspect signal has indeed been derived from the original, the identification number resulting from the above process will match the N-bit identification word of the original, bearing in mind either predicted or unknown "bit error" statistics. Signal-to-noise considerations will determine if there will be some kind of "bit error" in the identification process, leading to a form of X% probability of identification where X might be desired to be 99.9% or whatever. If the suspect copy is indeed not a copy of the original, an essentially random sequence of 0's and 1's will be produced, as well as an apparent lack of separation of the resultant values. This is to say, if the resultant values are plotted on a histogram, the existence of the N-bit identification signal will exhibit strong bi-level characteristics, whereas the non-existence of the code, or the existence of a different code of a different original, will exhibit a type of random gaussian-like distribution. This histogram separation alone should be sufficient for an identification, but it is even stronger proof of identification when an exact binary sequence can be objectively reproduced.

Specific Example

Imagine that we have taken a valuable picture of two heads of state at a cocktail party, pictures which are sure to earn some reasonable fee in the commercial market. We desire to sell this picture and ensure that it is not used in an unauthorized or uncompensated manner. This and the following steps are summarized in FIG. 2.

Assume the picture is transformed into a positive color print. We first scan this into a digitized form via a normal high quality black and white scanner with a typical photometric spectral response curve. (It is possible to get better ultimate signal to noise ratios by scanning in each of the three primary colors of the color image, but this nuance is not central to describing the core process.)

Let us assume that the scanned image now becomes a 4000 by 4000 pixel monochrome digital image with a grey scale accuracy defined by 12-bit grey values or 4096 allowed levels. We will call this the "original digital image" realizing that this is the same as our "original signal" in the above definitions.

During the scanning process we have arbitrarily set absolute black to correspond to digital value '30'. We estimate that there is a basic 2 Digital Number root mean square noise existing on the original digital image, plus a theoretical noise (known in the industry as "shot noise") of the square root of the brightness value of any given pixel. In formula, we have:

$$<\text{RMS Noise}_{n,m}> = \text{sqrt}(4+(V_{n,m}-30)) \quad (1)$$

Here, n and m are simple indexing values on rows and columns of the image ranging from 0 to 3999. Sqrt is the square root. V is the DN of a given indexed pixel on the original digital image. The <> brackets around the RMS noise merely indicates that this is an expected average value, where it is clear that each and every pixel will have a random error individually. Thus, for a pixel value having 1200 as a digital number or "brightness value", we find that its expected rms noise value is sqrt(1204)=34.70, which is quite close to 34.64, the square root of 1200.

We furthermore realize that the square root of the innate brightness value of a pixel is not precisely what the eye perceives as a minimum objectionable noise, thus we come up with the formula:

$$<\text{RMS Addable Noise}_{n,m}> = X^*\text{sqrt}(4+(V_{n,m}-30)\,\hat{}\,Y) \quad (2)$$

Where X and Y have been added as empirical parameters which we will adjust, and "addable" noise refers to our acceptable perceived noise level from the definitions above. We now intend to experiment with what exact value of X and Y we can choose, but we will do so at the same time that we are performing the next steps in the Eye-D process.

The next step in our process is to choose N of our N-bit identification word. We decide that a 16 bit main identification value with its 65536 possible values will be sufficiently large to identify the image as ours, and that we will be directly selling no more than 128 copies of the image which we wish to track, giving 7 bits plus an eighth bit for an odd/even adding of the first 7 bits (i.e. an error checking bit on the first seven). The total bits required now are at 4 bits for the 0101 calibration sequence, 16 for the main identification, 8 for the version, and we now throw in another 4 as a further error checking value on the first 28 bits, giving 32 bits as N. The final 4 bits can use one of many industry standard error checking methods to choose its four values.

We now randomly determine the 16 bit main identification number, finding for example, 1101 0001 1001 1110; our first versions of the original sold will have all 0's as the version identifier, and the error checking bits will fall out where they may. We now have our unique 32 bit identification word which we will embed on the original digital image.

To do this, we generate 32 independent random 4000 by 4000 encoding images for each bit of our 32 bit identification word. The manner of generating these random images is revealing. There are numerous ways to generate these. By far the simplest is to turn up the gain on the same scanner that was used to scan in the original photograph, only this time placing a pure black image as the input, then scanning this 32 times. The only drawback to this technique is that it does require a large amount of memory and that "fixed pattern" noise will be part of each independent "noise image." But, the fixed pattern noise can be removed via normal "dark frame" subtraction techniques. Assume that we set the absolute black average value at digital number '100,' and that rather than finding a 2 DN rms noise as we did in the normal gain setting, we now find an rms noise of 10 DN about each and every pixel's mean value.

We next apply a very mid-spatial-frequency bandpass filter (spatial convolution) to each and every independent random image, essentially removing the very high and the very low spatial frequencies from them. We remove the very low frequencies because simple real-world error sources like geometrical warping, splotches on scanners, misregistrations, and the like will exhibit themselves most at lower frequencies also, and so we want to concentrate our identification signal at higher spatial frequencies in order to avoid these types of corruptions. Likewise, we remove the higher frequencies because multiple generation copies of a given image, as well as compression-decompression transformations, tend to wipe out higher frequencies anyway, so there is no point in placing too much identification signal into these frequencies if they will be the ones most prone to being attenuated. Therefore, our new filtered independent noise images will be dominated by mid-spatial frequencies. On a practical note, since we are using 12-bit values on our scanner and we have removed the DC value effectively and our new rms noise will be slightly less than 10 digital numbers, it is useful to boil this down to a 6-bit value ranging from −32 through 0 to 31 as the resultant random image.

Next we add all of the random images together which have a '1' in their corresponding bit value of the 32-bit identification word, accumulating the result in a 16 bit signed integer image. This is the unattenuated and un-scaled version of the composite embedded signal.

Next we experiment visually with adding the composite embedded signal to the original digital image, through varying the X and Y parameters of equation 2. In formula, we visually iterate to both maximize X and to find the appropriate Y in the following:

$$V_{dist;n,m} = V_{orig;n,m} + V_{comp;n,m} * X * \text{sqrt}(4+V_{orig;n,m}\,\hat{}\,Y)$$

where dist refers to the candidate distributable image, i.e. we are visually iterating to find what X and Y will give us an acceptable image; orig refers to the pixel value of the original image; and comp refers to the pixel value of the composite image. The n's and m's still index rows and columns of the image and indicate that this operation is done on all 4000 by 4000 pixels. The symbol V is the DN of a given pixel and a given image.

As an arbitrary assumption, now, we assume that our visual experimentation has found that the value of X=0.025 and Y=0.6 are acceptable values when comparing the original image with the candidate distributable image. This is to say, the distributable image with the "extra noise" is acceptably close to the original in an aesthetic sense. Note that since our individual random images had a random rms noise value around 10 DN, and that adding approximately 16 of these images together will increase the composite noise to around 40 DN, the X multiplication value of 0.025 will bring the added rms noise back to around 1 DN, or half the amplitude of our innate noise on the original. This is roughly a 1 dB gain in noise at the dark pixel values and correspondingly more at the brighter values modified by the Y value of 0.6.

So with these two values of X and Y, we now have constructed our first versions of a distributable copy of the original. Other versions will merely create a new composite signal and possibly change the X slightly if deemed necessary. We now lock up the original digital image along with the 32-bit identification word for each version, and the 32 independent random 4-bit images, waiting for our first case of a suspected piracy of our original. Storage wise, this is about 14 Megabytes for the original image and 32*0.5 bytes*16 million=~256 Megabytes for the random individual encoded images. This is quite acceptable for a single valuable image. Some storage economy can be gained by simple lossless compression.

Finding a Suspected Piracy of our Image

Figure 3:
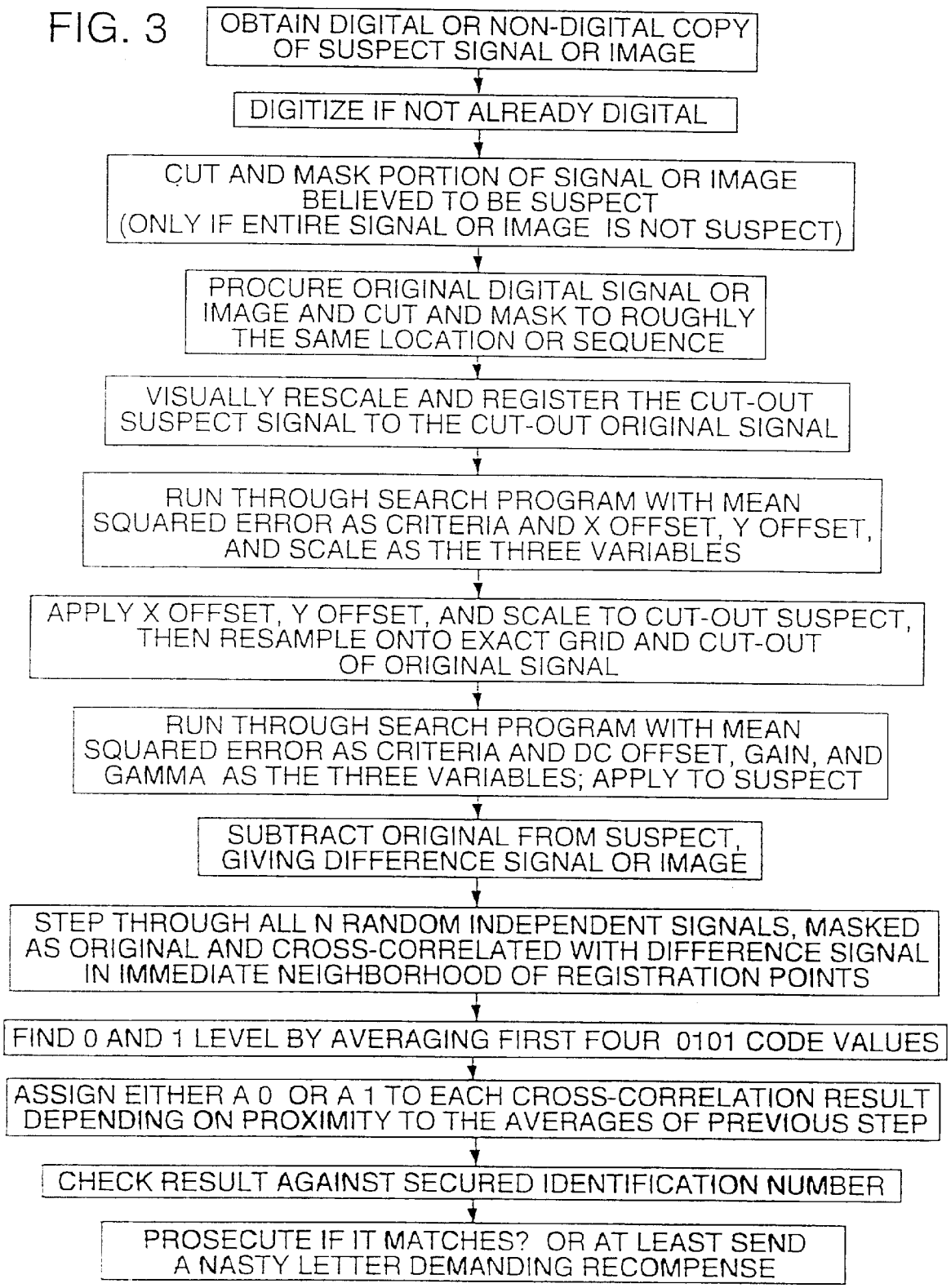
FIG. 3 is a step-wise description of how a suspected copy of an original is identified, provided that original and its copies are using the Eye-D identification system methodology.

We sell our image and several months later find our two heads of state in the exact poses we sold them in, seemingly cut and lifted out of our image and placed into another stylized background scene. This new "suspect" image is being printed in 100,000 copies of a given magazine issue, let us say. We now go about determining if a portion of our original image has indeed been used in what is clearly an unauthorized manner. FIG. 3 summarizes the details.

The first step is to take an issue of the magazine, cut out the page with the image on it, then carefully but not too carefully cut out the two figures from the background image using ordinary scissors. If possible, we will cut out only one connected piece rather than the two figures separately. We paste this onto a black background and scan this into a digital form. Next we electronically flag or mask out the black background, which is easy to do by visual inspection.

We now procure the original digital image from our secured place along with the 32-bit identification word and the 32 individual embedded images. We place the original digital image onto our computer screen using standard image manipulation software, and we roughly cut along the same borders as our masked area of the suspect image, masking this image at the same time in roughly the same manner. The word 'roughly' is used since an exact cutting is not needed, it merely aids the identification statistics to get it reasonably close.

Next we rescale the masked suspect image to roughly match the size of our masked original digital image, that is, we digitally scale up or down the suspect image and roughly overlay it on the original image. Once we have performed this rough registration, we then throw the two images into an automated scaling and registration program. The program performs a search on the three parameters of x position, y position, and spatial scale, with the figure of merit being the mean squared error between the two images given any given scale variable and x and y offset. This is a fairly standard image processing methodology. Typically this would be done using generally smooth interpolation techniques and done to sub-pixel accuracy. The search method can be one of many, where the simplex method is a typical one.

Once the optimal scaling and x-y position variables are found, next comes another search on optimizing the black level, brightness gain, and gamma of the two images. Again, the figure of merit to be used is mean squared error, and again the simplex or other search methodologies can be used to optimize the three variables. After these three variables are optimized, we apply their corrections to the suspect image and align it to exactly the pixel spacing and masking of the original digital image and its mask. We can now call this the standard mask.

The next step is to subtract the original digital image from the newly normalized suspect image only within the standard mask region. This new image is called the difference image.

Then we step through all 32 individual random embedded images, doing a local cross-orrelation between the masked difference image and the masked individual embedded image. 'Local' refers to the idea that one need only start correlating over an offset region of ±1 pixels of offset between the nominal registration points of the two images found during the search procedures above. The peak correlation should be very close to the nominal registration point of 0,0 offset, and we can add the 3 by 3 correlation values together to give one grand correlation value for each of the 32 individual bits of our 32-bit identification word.

After doing this for all 32 bit places and their corresponding random images, we have a quasi-floating point sequence of 32 values. The first four values represent our calibration signal of 0101. We now take the mean of the first and third floating point value and call this floating point value '0,' and we take the mean of the second and the fourth value and call this floating point value '1.' We then step through all remaining 28 bit values and assign either a '0' or a '1' based simply on which mean value they are closer to. Stated simply, if the suspect image is indeed a copy of our original, the embedded 32-bit resulting code should match that of our records, and if it is not a copy, we should get general randomness. The third and the fourth possibilities of 3) Is a copy but doesn't match identification number and 4) isn't a copy but does match are, in the case of 3), possible if the signal to noise ratio of the process has plummeted, i.e. the 'suspect image' is truly a very poor copy of the original, and in the case of 4) is basically one chance in four billion since we were using a 32-bit identification number. If we are truly worried about 4), we can just have a second independent lab perform their own tests on a different issue of the same magazine. Finally, checking the error-check bits against what the values give is one final and possibly overkill check on the whole process. In situations where signal to noise is a possible problem, these error checking bits might be eliminated without too much harm.

Assuming that a positive identification is made, we must now decide what to do about it.

Benefits of the Eye-D Method

Now that a full description of the preferred embodiment has been described via a detailed example, it is appropriate to point out the rationale of some of the process steps and their benefits.

The ultimate benefits of the process are that obtaining an identification number is fully independent of the manners and methods of preparing the difference image. That is to say, the manners of preparing the difference image, such as cutting, registering, scaling, etcetera, cannot increase the odds of finding an identification number when none exists; it only helps the signal-to-noise ratio of the identification process when a true identification number is present. Methods of preparing images for identification can be different from each other even, providing the possibility for multiple independent methodologies for making a match.

The ability to obtain a match even on sub-sets of the original signal or image is a key point in today's information-rich world. Cutting and pasting both images and sound clips is becoming more common, thus Eye-D provides a method whereby identification can still be performed even when original material has been thus corrupted. Finally, the signal to noise ratio of matching should begin to become difficult only when the copy material itself has been significantly altered either by noise or by significant distortion; both of these also will affect that copy's commercial value, so that trying to thwart the system can only be done at the expense of a huge decrease in commercial value.

The fuillest expression of the Eye-D system will come when it becomes an industry standard and numerous independent groups set up with their own means or 'in-house' brand of applying embedded identification numbers and in their decipherment. Numerous independent group identification will further enhance the ultimate objectivity of the method, thereby enhancing its appeal as an industry standard.

Use of True Polarity in Creating the Composite Embedded Code Signal

The foregoing disclosure made use of the 0 and 1 formalism of binary technology to accomplish its ends. Specifically, the 0's and 1's of the N-bit identification word directly multiplied their corresponding individual embedded code signal to form the composite embedded code signal (step 8, FIG. 2). This approach certainly has its conceptual simplicity, but the multiplication of an embedded code signal by 0 along with the storage of that embedded code contains a kind of inefficiency.

It is preferred to maintain the formalism of the 0 and 1 nature of the N-bit identification word, but to have the 0's of the word induce a subtraction of their corresponding embedded code signal. Thus, in step 8 of FIG. 2, rather than only 'adding' the individual embedded code signals which correspond to a '1' in the Nbit identification word, we will also 'subtract' the individual embedded code signals which correspond to a '0' in the N-bit identification word.

At first glance this seems to add more apparent noise to the final composite signal. But it also increases the energy-wise separation of the 0's from the 1's, and thus the 'gain' which is applied in step 10, FIG. 2 can be correspondingly lower.

We can refer to this improvement as the use of true polarity. The main advantage of this improvement can largely be summarized as 'informational efficiency.'

'Perceptual Orthogonality' of the Individual Embedded Code Signals

The foregoing disclosure contemplates the use of generally random noise-like signals as the individual embedded code signals. This is perhaps the simplest form of signal to generate. However, there is a form of informational optimization which can be applied to the set of the individual embedded signals which the applicant describes under the rubric 'perceptual orthogonality.' This term is loosely based on the mathematical concept of the orthogonality of vectors, with the current additional requirement that this orthogonality should maximize the signal energy of the identification information while maintaining it below some perceptibility threshold. Put another way, the embedded code signals need not necessarily be random in nature.

Use and Improvements of the Invention in the Field of Emulsion-Based Photography The foregoing portions of this disclosure outlined techniques that are applicable to photographic materials. The following section explores the details of this area further and discloses certain improvements which lend themselves to a broad range of applications.

The first area to be discussed involves the preapplication or preexposing of a serial number onto traditional photographic products, such as negative film, print paper, transparencies, etc. In general, this is a way to embed a prior unique serial numbers (and by implication, ownership and tracking information) into photographic material. The serial numbers themselves would be a permanent part of the normally exposed picture, as opposed to being relegated to the margins or stamped on the back of a printed photograph, which all require separate locations and separate methods of copying. The 'serial number' as it is called here is generally synonymous with the N-bit identification word, only now we are using a more common industrial terminology.

In FIG. 2, step 11, the disclosure calls for the storage of the 'original [image]' along with code images. Then in FIG. 3, step 9, it directs that the original be subtracted from the suspect image, thereby leaving the possible identification codes plus whatever noise and corruption has accumulated. Therefore, the previous disclosure made the tacit assumption that there exists an original without the composite embedded signals.

Now in the case of selling print paper and other duplication film products, this will still be the case, i.e., an "original" without the embedded codes will indeed exist and the basic methodology of the invention can be employed. The original film serves perfectly well as an 'unencoded original.'

However, in the case where preexposed negative film is used, the composite embedded signal pre-exists on the original film and thus there will never be an "original" separate from the pre-embedded signal. It is this latter case, therefore, which will be examined a bit more closely along with various remedies on how to use the basic principles of the invention (the former cases adhering to the previously outlined methods).

The clearest point of departure for the case of pre-numbered negative film, i.e. negative film which has had each and every frame pre-exposed with a very faint and unique composite embedded signal, comes at step 9 of FIG. 3 as previously noted. There are certainly other differences as well, but they are mostly logistical in nature such as how and when to embed the signals on the film, how to store the code numbers and serial number, etc. Obviously the preexposing of film would involve a major change to the general mass production process of creating and packaging film.

Figure 4:
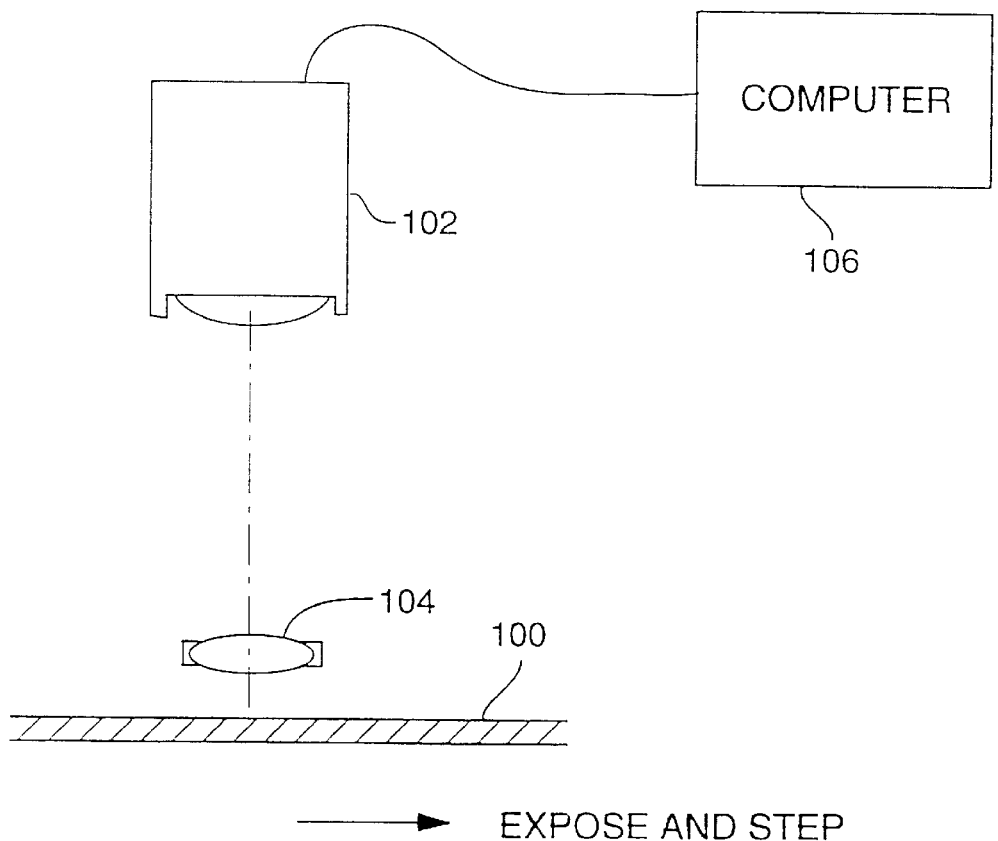
FIG. 4 is a schematic view of an apparatus for preexposing film with identification information in accordance with another embodiment of the present invention.

FIG. 4 has a schematic outlining one potential post-hoc mechanism for preexposing film. 'Post-hoc' refers to applying a process after the full common manufacturing process of film has already taken place. Eventually, economies of scale may dictate placing this pre-exposing process directly into the chain of manufacturing film. Depicted in FIG. 4 is what is commonly known as a film writing system. The computer, 106, displays the composite signal produced in step 8, FIG. 2, on its phosphor screen. A given frame of film is then exposed by imaging this phosphor screen, where the exposure level is generally very faint, i.e. generally imperceptible. Clearly, the marketplace will set its own demands on how faint this should be, that is, the level of added 'graininess' as practitioners would put it. Each frame of film is sequentially exposed, where in general the composite image displayed on the CRT 102 is changed for each and every frame, thereby giving each frame of film a different serial number. The transfer lens 104 highlights the focal conjugate planes of a film frame and the CRT face.

Getting back to the applying the principles of the invention in the case of preexposed negative film. At step 9, FIG. 3, if we were to subtract the "original" with its embedded code, we would obviously be "erasing" the code as well since the code is an integral part of the original. Fortunately, remedies do exist and identifications can still be made. However, it will be a challenge to artisans who refine this invention to have the signal to noise ratio of the identification process in the preexposed negative case approach the signal to noise ratio of the case where the un-encoded original exists.

A succinct definition of the problem is in order at this point. Given a suspect picture (signal), find the embedded identification code IF a code exists at al. The problem reduces to one of finding the amplitude of each and every individual embedded code signal within the suspect picture, not only within the context of noise and corruption as was previously explained, but now also within the context of the coupling between a captured image and the codes. 'Coupling' here refers to the idea that the captured image "randomly biases" the cross-correlation.

So, bearing in mind this additional item of signal coupling, the identification process now estimates the signal amplitude of each and every individual embedded code signal (as opposed to taking the crosscorrelation result of step 12, FIG. 3). If our identification signal exists in the suspect picture, the amplitudes thus found will split into a polarity with positive amplitudes being assigned a '1' and negative amplitudes being assigned a '0'. Our unique identification code manifests itself. If, on the other hand, no such identification code exists or it is someone else's code, then a random gaussian-like distribution of amplitudes is found with a random hash of values.

It remains to provide a few more details on how the amplitudes of the individual embedded codes are found. Again, fortunately, this exact problem has been treated in other technological applications. Besides, throw this problem and a little food into a crowded room of mathematicians and statisticians and surely a half dozen optimized methodologies will pop out after some reasonable period of time. It is a rather cleanly defined problem.

One specific example solution which is also the current preferred embodiment comes from the field of astronomical imaging. Here, it is a mature prior art to subtract out a "thermal noise frame" from a given CCD image of an object. Often, however, it is not precisely known what scaling factor to use in subtracting the thermal frame and a search for the correct scaling factor is performed. This is precisely the task of this step of the present invention.

General practice merely performs a common search algorithm on the scaling factor, where a scaling factor is chosen and a new image is created according to:

NEW IMAGE=ACQUIRED IMAGE−SCALE * THERMAL IMAGE

The new image is applied to the fast fourier transform routine and a scale factor is eventually found which minimizes the integrated high frequency content of the new image.

This general type of search operation with its minimization of a particular quantity is exceedingly common. The scale factor thus found is the "amplitude" being sought within the steps of the present invention. Refinements which are contemplated but not yet implemented are where the coupling of the higher derivatives of the acquired image and the embedded codes are estimated and removed from the calculated scale factor. In other words, certain bias effects from the coupling mentioned earlier are present and should be eventually accounted for and removed both through theoretical and empirical experimentation.

Use and Improvements of the Invention in the Detection of Signal or Image Alteration Apart from the basic need of identifying a signal or image as a whole, there is also a rather ubiquitous need to detect possible alterations to a signal or image. The following section describes how the present invention, with certain modifications and improvements, can be used as a powerfuil tool in this area. The potential scenarios and applications of detecting alterations are innumerable.

To first summarize, assume that we have a given signal or image which has been positively identified using the basic methods outlined in the foregoing disclosure. In other words, we know its Nbit identification word, its individual embedded code signals, and its composite embedded code. We can then fairly simply create a spatial map of the composite code's amplitude within our given signal or image. Furthermore, we can divide this amplitude map by the known composite code's spatial amplitude, giving a normalized map, i.e. a map which should fluctuate about some global mean value. By simple examination of this map, we can visually detect any areas which have been significantly altered wherein the value of the normalized amplitude dips below some statistically set threshold based purely on typical noise and corruption (error).

The details of implementing the creation of the amplitude map have a variety of choices. The preferred embodiment at this time is to perform the same procedure which is used to determine the signal amplitude as described above, only now we step and repeat the multiplication of any given area of the signal/image with a gaussian weight function centered about the area we are investigating.

Universal Versus Custom Codes

The disclosure thus far has outline how each and every source signal has its own unique set of individual embedded code signals. This clearly entails the storage of a significant amount of additional code information above and beyond the original, and many applications may merit some form of economizing.

One such approach to economizing is to have a given set of individual embedded code signals be common to a batch of source materials. For example, one thousand images can all utilize the same basic set of individual embedded code signals. The storage requirements of these codes then become a small fraction of the overall storage requirements of the source material.

Furthermore, some applications can utilize a universal set of individual embedded code signals, i.e., codes which remain the same for all instances of distributed material. This type of requirement would be seen by systems which wish to hide the N-bit identification word itself, yet have standardized equipment be able to read that word. This can be used in systems which make go/no go decisions at point-of-read locations. The potential drawback to this set-up is that the universal codes are more prone to be sleuthed or stolen; therefore they will not be as secure as the apparatus and methodology of the previously disclosed arrangement. Perhaps this is just the difference between 'high security' and 'air-tight security,' a distinction carrying little weight with the bulk of potential applications.

Use of the Invention in Printing, Paper, Documents, Plastic Coated Identification Cards, and Other Material Where Global Embedded Codes Can Be Imprinted The term 'signal' in the title of the disclosure is often used narrowly to refer to digital data information, audio signals, images, etc. A broader interpretation of 'signal,' and the one more generally intended, includes any form of modulation of any material whatsoever. Thus, the micro-topology of a piece of common paper becomes a 'signal' (e.g. it height as a function of x-y coordinates). The reflective properties of a flat piece of plastic (as a function of space also) becomes a signal. The point is that photographic emulsions, audio signals, and digitized information are not the only types of signals capable of utilizing the principles of the invention.

As a case in point, a machine very much resembling a braille printing machine can be designed so as to imprint unique 'noise-like' indentations as outlined in the disclosure. These indentations can be applied with a pressure which is much smaller than is typically applied in creating braille, to the point where the patterns are not noticed by a normal user of the paper. But by following the steps of the present disclosure and applying them via the mechanism of micro-indentations, a unique identification code can be placed onto any given sheet of paper, be it intended for everyday stationary purposes, or be it for important documents, legal tender, or other secured material.

The reading of the identification material in such an embodiment generally proceeds by merely reading the document optically at a variety of angles. This would become an inexpensive method for deducing the micro-topology of the paper surface. Certainly other forms of reading the topology of the paper are possible as well.

In the case of plastic encased material such as identification cards, e.g. driver's licenses, a similar braille-like impressions machine can be utilized to imprint unique identification codes. Subde layers of photoreactive materials can also be embedded inside the plastic and 'exposed.'

It is clear that wherever a material exists which is capable of being modulated by 'noise-like' signals, that material is an appropriate carrier for unique identification codes and utilization of the principles of the invention. The trick becomes one of economically applying the identification information and maintaining the signal level below an acceptability threshold which each and every application will define for itself.

Appendix A Description

Appendix A contains the source code of an implementation and verification of the Eye-D system on an 8-bit black and white imaging system.

CONCLUSION

Having described and illustrated the principles of my invention with reference to an illustrative embodiment and several variations thereof, it should be apparent that the invention can be modified in arrangement and detail without departing from such principles. Accordingly, I claim as my invention all such embodiments as come within the scope and spirit of the following claims and equivalents thereto.

I claim:

1. In an image processing method that includes steganographically encoding an input two-dimensional image to embed a multi-bit message code therein, the image comprising a plurality of rows of picture data, the method including processing said input image in accordance with said multi-bit message code to produce an output image having the message code steganographically encoded therein, an improvement including: encoding the message code throughout the output image so that the message code can be recovered from first and second non-overlapping excerpts of the output image; and representing a given bit of the encoded message code differently, both in absolute and percentage terms, in said first and second excerpts to reduce image degradation and increase message security; wherein subtraction of the input two-dimensional image from the output image yields a difference frame comprised of difference values, said difference frame having a snow-like appearance in which at least half of said difference values have non-zero values.

2. The method of claim 1 which includes performing said processing in a pixel domain.

3. In an image processing method that includes steganographically encoding an input image signal to embed a multi-bit message code therein, the input image signal including a plurality of picture data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said picture data in accordance with said multi-bit message code, and also in accordance with local scaling data to control the amplitude of the multi-bit message code at different locations in the image, said local scaling data being computed from said picture data using a non-linear function.

4. The method of claim 3 which includes deriving the local scaling data from picture data related thereto by use of a non-linear function, wherein doubling the value of picture data does not double the local scaling data corresponding thereto.

5. The method of claim 3 in which the local scaling data is also a function of first and second non-unity parameters.

6. The method of claim 3 which includes performing said processing in a pixel domain.

7. In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function.

8. The method of claim 7 which includes deriving the local scaling data from audio data related thereto by use of a non-linear function, wherein doubling the value of audio data does not double the local scaling data corresponding thereto.

9. The method of claim 7 in which the local scaling data is also a finction of first and second non-unity parameters.

10. In an image processing method that includes steganographically encoding an input two-dimensional image to embed a multi-bit message code therein, the image being represented by plural elements, the method including processing said input image in accordance with said multi-bit message code to produce an output image having the message code encoded therein, an improvement including: encoding the message code throughout the output image so that the message code can be recovered from first and second non-overlapping rectangular excerpts of the output image when same is represented in the pixel domain; and representing a given bit of the encoded message code differently, both in absolute and percentage terms, in said first and second excerpts to reduce image degradation and increase message security, said encoding including changing a plurality of said elements in accordance with said multi-bit message code, and also in accordance with local scaling data to control the amplitude of the multi-bit message code at different locations in the image, said local scaling data being computed from said picture elements using a non-linear function.

11. The method of claim 1 in which the multi-bit message code comprises at least thirty two bits.

12. The method of claim 1 in which the method includes processing with pseudorandom noise data.

13. A tangible storage medium having an image processed in accordance with the method of claim 1 stored thereon.

14. The nierhod of claim 1 in which the input image is comprised of plural samples, and the processing includes performing binary addition operations between said samples and overlay data corresponding thereto.

15. The method of claim 1 in which the multi-bit message code represents at least two fields of information, a first of said fields serving to identify a proprietor of said image, a second of said fields serving to track particular image data.

16. The method of claim 3 in which the multi-bit message code comprises at least thirt two bits.

17. The method of claim 3 in which the method includes processing with pseudo-random noise data.

18. A tangible storage medium having an image processed in accordance with the method of claim 19 stored thereon.

19. A video processing method that includes performing the method of claim 3 on plural frames of a video.

20. The method of claim 3 in which the input signal is comprised of plural samples, and the processing includes performing binary addition operations between said samples and overlay data corresponding thereto.

21. The method of claim 3 in which the multi-bit message code represents at least two fields of information, a first of s d fields serving to identify a proprietor of said image, a second of said fields serving to track par icular image data.

22. The method of claim 3 in which the multi-bit message code comprises at least eight bits.

23. The method of claim 7 in which the multi-bit message code comprises at least thirty two bits.

24. The method of claim 7 in which the method includes processing with pseudo-random noise data.

25. A tangible storage medium having audio processed in accordance with the method of claim 23 stored thereon.

26. The method of claim 3 in which the input signal is comprised of plural samples, and the processing includes performing binary addition operations between said samples and overlay data corresponding thereto.

27. The method of claim 7 in which the multi-bit message code represents at least two fields of information, a first of s ad fields serving to identify a proprietor of said audio, a second of said fields serving to track particular audio data.

* * * * *

US006122392C1

(12) EX PARTE REEXAMINATION CERTIFICATE (4961st)
United States Patent
Rhoads

(10) Number: US 6,122,392 C1
(45) Certificate Issued: *Jul. 13, 2004

(54) SIGNAL PROCESSING TO HIDE PLURAL-BIT INFORMATION IN IMAGE, VIDEO, AND AUDIO DATA

(75) Inventor: Geoffrey B. Rhoads, West Linn, OR (US)

(73) Assignee: Digimarc Corporation, Tualatin, OR (US)

Reexamination Request:
No. 90/005,911, Jan. 16, 2001

Reexamination Certificate for:
Patent No.: 6,122,392
Issued: Sep. 19, 2000
Appl. No.: 08/967,693
Filed: Nov. 12, 1997

(*) Notice: This patent is subject to a terminal disclaimer.

Related U.S. Application Data

(63) Continuation of application No. 08/614,521, filed on Mar. 15, 1996, now Pat. No. 5,745,604, which is a continuation of application No. 08/215,289, filed on Mar. 17, 1994, now abandoned, which is a continuation-in-part of application No. 08/154,866, filed on Nov. 18, 1993, now abandoned.

(51) Int. Cl.⁷ ................................................. G06K 9/00

(52) U.S. Cl. ...................................... 382/100; 382/232

(58) Field of Search ............................. 382/100, 115, 382/232; 380/210, 252, 287, 54; 381/73.1; 704/200.1, 273; 713/176; 370/527, 529

(56) References Cited

U.S. PATENT DOCUMENTS

| 2,630,525 | A | 3/1953 | Tomberlin et al. ............. 250/6 |
| 2,881,244 | A | 4/1959 | Pawley et al. ................ 178/5.1 |
| 3,004,104 | A | 10/1961 | Hembrooke .................... 179/2 |
| 3,406,344 | A | 10/1968 | Hopper ........................ 325/50 |
| 3,583,237 | A | 6/1971 | Bayha .......................... 73/432 |
| 3,638,188 | A | 1/1972 | Pincoffs et al. .... 340/146.3 AC |
| 3,805,286 | A | 4/1974 | Kavanagh et al. ............ 360/51 |
| 3,845,391 | A | 10/1974 | Crosby ........................ 325/64 |
| 3,885,217 | A | 5/1975 | Cintron ....................... 325/26 |
| 3,894,190 | A | 7/1975 | Gassmann ........... 179/15.55 R |
| 3,900,890 | A | 8/1975 | Eibner ........................ 360/73 |
| 3,969,830 | A | 7/1976 | Grasham ........................ 35/2 |
| 4,048,619 | A | 9/1977 | Forman, Jr. et al. ........ 340/154 |
| 4,079,419 | A | 3/1978 | Siegle et al. ................ 358/193 |
| 4,086,634 | A | 4/1978 | Cook .......................... 360/60 |
| 4,122,501 | A | 10/1978 | Sordello et al. .............. 360/51 |
| 4,225,967 | A | * 9/1980 | Miwa et al. .................. 455/68 |
| 4,237,484 | A | 12/1980 | Brown et al. ............... 358/142 |
| 4,238,849 | A | * 12/1980 | Gassmann .................... 370/11 |
| 4,245,346 | A | 1/1981 | Grady et al. ................. 455/28 |
| 4,307,899 | A | 12/1981 | Hoppe ........................ 283/7 |
| 4,310,180 | A | 1/1982 | Mowry, Jr. et al. ......... 283/8 B |
| 4,323,921 | A | 4/1982 | Guillou ...................... 358/114 |
| 4,337,483 | A | 6/1982 | Guillou ...................... 358/114 |
| 4,351,547 | A | 9/1982 | Brooks, II .................. 283/8 R |
| 4,379,947 | A | * 4/1983 | Warner .................... 179/1 GD |

(List continued on next page.)

FOREIGN PATENT DOCUMENTS

| DE | 2943436 A1 | 5/1981 | .......... G06K/19/06 |
| EP | 0234885 B1 | 4/1991 | ........... B41M/3/10 |
| EP | 0469864 A2 | 2/1992 | ............ G06K/1/12 |

(List continued on next page.)

OTHER PUBLICATIONS

English Translation of Onishi et al., "Detection of Watermark from a Clipped Picture Using Wavelet," ITE Technical Report, vol. 21, No. 42, Jul. 1997, pp. 1–5.*

(List continued on next page.)

Primary Examiner—Andrew W. Johns

(57) ABSTRACT

An identification code signal is impressed on a carrier to be identified (such as an electronic data signal or a physical medium) in a manner that permits the identification signal later to be statistically discerned and the carrier thereby identified. The method and apparatus are characterized by robustness despite degradation of the encoded carrier, and by holographic permeation of the identification signal throughout the carrier.

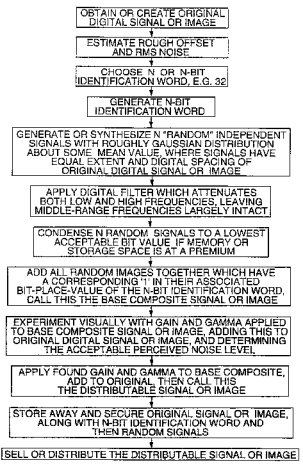

U.S. PATENT DOCUMENTS

| | | | |
|---|---|---|---|
| 4,395,600 A | * 7/1983 | Lundy et al. | 179/1.5 M |
| 4,495,620 A | 1/1985 | Steele et al. | 370/118 |
| 4,504,084 A | 3/1985 | Jauch | 283/94 |
| 4,512,013 A | 4/1985 | Nash et al. | 370/69.1 |
| 4,523,311 A | 6/1985 | Lee et al. | 370/69.1 |
| 4,593,389 A | 6/1986 | Wurzburg et al. | 370/110.1 |
| 4,644,422 A | 2/1987 | Bedini | 360/60 |
| 4,672,605 A | 6/1987 | Hustig et al. | 370/76 |
| 4,677,466 A | 6/1987 | Lert, Jr. et al. | 358/84 |
| 4,678,322 A | 7/1987 | Finkel et al. | 355/133 |
| 4,697,209 A | 9/1987 | Kiewit et al. | 358/84 |
| 4,750,173 A | * 6/1988 | Blüthgen | 370/111 |
| 4,777,529 A | 10/1988 | Schultz et al. | 358/143 |
| 4,791,449 A | 12/1988 | Foley et al. | 355/3 R |
| 4,885,757 A | 12/1989 | Provence | 375/96 |
| 4,914,700 A | 4/1990 | Alasia | 380/54 |
| 4,945,412 A | 7/1990 | Kramer | 358/142 |
| 4,949,381 A | 8/1990 | Pastor | 380/51 |
| 4,965,680 A | 10/1990 | Endoh | 360/60 |
| 4,980,782 A | 12/1990 | Ginkel | 360/60 |
| 4,993,068 A | 2/1991 | Piosenka et al. | 380/23 |
| 5,018,767 A | 5/1991 | Wicker | 283/67 |
| 5,040,059 A | 8/1991 | Leberl | 358/107 |
| 5,083,224 A | 1/1992 | Hoogendoorn et al. | 360/60 |
| 5,087,507 A | 2/1992 | Heinzer | 428/195 |
| 5,093,867 A | 3/1992 | Hori et al. | 362/8 |
| 5,103,459 A | 4/1992 | Gilhousen et al. | 375/1 |
| 5,134,496 A | 7/1992 | Schwab et al. | 358/335 |
| 5,136,436 A | 8/1992 | Kahlman | 360/40 |
| 5,144,658 A | 9/1992 | Takahashi | 380/3 |
| 5,146,457 A | 9/1992 | Veldhuis et al. | 370/111 |
| 5,157,726 A | 10/1992 | Merkle et al. | 380/23 |
| 5,193,853 A | 3/1993 | Wicker | 283/85 |
| 5,208,630 A | 5/1993 | Goodbrand et al. | 355/201 |
| 5,216,724 A | 6/1993 | Suzuki et al. | 382/7 |
| 5,221,833 A | 6/1993 | Hecht | 235/494 |
| 5,231,663 A | 7/1993 | Earl et al. | 380/18 |
| 5,243,411 A | 9/1993 | Shirochi et al. | 358/12 |
| 5,254,196 A | 10/1993 | Abowitz et al. | 156/235 |
| 5,258,998 A | 11/1993 | Koide | 375/7 |
| 5,262,860 A | 11/1993 | Fitzpatrick et al. | 358/142 |
| 5,278,400 A | 1/1994 | Appel | 235/494 |
| 5,285,498 A | 2/1994 | Johnston | 381/2 |
| 5,287,407 A | 2/1994 | Holmes | 380/4 |
| 5,291,243 A | 3/1994 | Heckman et al. | 355/201 |
| 5,301,257 A | 4/1994 | Tani | 395/11 |
| 5,315,448 A | 5/1994 | Ryan | 360/60 |
| 5,319,475 A | 6/1994 | Kay et al. | 359/2 |
| 5,319,735 A | 6/1994 | Preuss et al. | 395/2.14 |
| 5,321,470 A | 6/1994 | Hasuo et al. | 355/201 |
| 5,321,773 A | 6/1994 | Kopec et al. | 382/30 |
| 5,335,277 A | 8/1994 | Harvey et al. | 380/20 |
| 5,335,312 A | 8/1994 | Mekata et al. | 395/2.11 |
| 5,365,586 A | 11/1994 | Indeck et al. | 380/3 |
| 5,369,261 A | 11/1994 | Shamir | 235/469 |
| 5,374,976 A | 12/1994 | Spannenburg | 355/201 |
| 5,375,886 A | 12/1994 | Tsuchiya | 283/93 |
| 5,379,093 A | 1/1995 | Hashimoto et al. | 355/201 |
| 5,390,003 A | 2/1995 | Yamaguchi et al. | 355/201 |
| 5,390,185 A | 2/1995 | Hooijmans et al. | 370/98 |
| 5,390,259 A | 2/1995 | Withgott et al. | 382/9 |
| 5,408,258 A | 4/1995 | Kolessar | 348/5.5 |
| 5,408,505 A | 4/1995 | Indeck et al. | 380/4 |
| 5,412,718 A | 5/1995 | Narasimhalu et al. | 380/4 |
| 5,412,731 A | 5/1995 | Desper | 381/1 |
| 5,424,807 A | 6/1995 | Ohmura | 355/201 |
| 5,426,710 A | 6/1995 | Suzuki et al. | 382/135 |
| 5,428,598 A | 6/1995 | Veldhuis et al. | 369/275.3 |
| 5,434,649 A | 7/1995 | Hasuo et al. | 355/201 |
| 5,436,653 A | 7/1995 | Ellis et al. | 348/2 |
| 5,437,897 A | 8/1995 | Tanaka et al. | 428/29 |
| 5,444,779 A | 8/1995 | Daniele | 380/3 |
| 5,449,895 A | 9/1995 | Hecht et al. | 235/494 |
| 5,449,896 A | 9/1995 | Hecht et al. | 235/494 |
| 5,450,489 A | 9/1995 | Ostrover et al. | 380/3 |
| 5,453,968 A | 9/1995 | Veldhuis et al. | 369/84 |
| 5,469,222 A | 11/1995 | Sprague | 348/580 |
| 5,481,334 A | 1/1996 | Arimoto et al. | 355/201 |
| 5,483,276 A | 1/1996 | Brooks et al. | 348/2 |
| 5,495,282 A | 2/1996 | Mostafa et al. | 348/5 |
| 5,495,581 A | 2/1996 | Tsai | 395/154 |
| 5,504,518 A | 4/1996 | Ellis et al. | 348/2 |
| 5,510,900 A | 4/1996 | Shirochi et al. | 358/335 |
| 5,515,451 A | 5/1996 | Tsuji et al. | 382/135 |
| 5,521,372 A | 5/1996 | Hecht et al. | 235/494 |
| 5,524,933 A | 6/1996 | Kunt et al. | 283/67 |
| 5,530,655 A | 6/1996 | Lokhoff et al. | 364/514 A |
| 5,537,216 A | 7/1996 | Yamashita et al. | 358/335 |
| 5,572,246 A | 11/1996 | Ellis et al. | 348/2 |
| 5,574,962 A | 11/1996 | Fardeau et al. | 455/2 |
| 5,581,658 A | 12/1996 | O'Hagan et al. | 395/22 |
| 5,581,800 A | 12/1996 | Fardeau et al. | 455/2 |
| 5,583,614 A | 12/1996 | Hasuo et al. | 355/201 |
| 5,617,119 A | 4/1997 | Briggs et al. | 345/611 |
| 5,627,655 A | 5/1997 | Okamoto et al. | 386/94 |
| 5,636,292 A | 6/1997 | Rhoads | 382/232 |
| 5,671,277 A | 9/1997 | Ikenoue et al. | 380/7 |
| 5,710,834 A | 1/1998 | Rhoads | 382/232 |
| 5,712,920 A | 1/1998 | Spille | 381/104 |
| 5,731,880 A | 3/1998 | Takaragi et al. | 358/296 |
| 5,745,604 A | 4/1998 | Rhoads | 382/232 |
| 5,748,763 A | 5/1998 | Rhoads | 382/115 |
| 5,748,783 A | 5/1998 | Rhoads | 382/232 |
| 5,768,426 A | 6/1998 | Rhoads | 382/232 |
| 5,790,932 A | 8/1998 | Komaki et al. | 399/366 |
| 5,809,160 A | 9/1998 | Powell et al. | 382/100 |
| 5,832,119 A | 11/1998 | Rhoads | 382/232 |
| 5,841,886 A | 11/1998 | Rhoads | 382/115 |
| 5,841,978 A | 11/1998 | Rhoads | 395/200.47 |
| 5,845,008 A | 12/1998 | Katoh et al. | 382/217 |
| 5,850,481 A | 12/1998 | Rhoads | 382/232 |
| 5,862,260 A | 1/1999 | Rhoads | 382/232 |
| 5,872,589 A | 2/1999 | Morales | 348/13 |
| 5,893,101 A | 4/1999 | Balogh et al. | 707/100 |
| 5,907,443 A | 5/1999 | Hirata | 360/60 |
| 5,949,903 A | 9/1999 | Outa et al. | 382/165 |
| 5,960,151 A | 9/1999 | Takahashi | 386/94 |
| 5,991,500 A | 11/1999 | Kanota et al. | 386/94 |
| 6,026,193 A | 2/2000 | Rhoads | 382/232 |
| 6,086,706 A | 7/2000 | Brassil et al. | 156/277 |
| 6,111,954 A | 8/2000 | Rhoads | 380/54 |

FOREIGN PATENT DOCUMENTS

| | | | | |
|---|---|---|---|---|
| EP | 0319524 B1 | 6/1994 | | G07D/7/00 |
| EP | 0617545 A1 | 9/1994 | | H04N/1/40 |
| EP | 0642060 A2 | 3/1995 | | G03G/15/01 |
| EP | 0651554 A1 | 5/1995 | | H04N/1/21 |
| EP | 0660275 A2 | 6/1995 | | G07D/7/00 |
| EP | 0664642 A2 | 7/1995 | | H04N/1/387 |
| EP | 0493053 B1 | 5/1996 | | G06K/19/06 |
| EP | 0691632 B1 | 10/1998 | | G07D/7/00 |
| EP | 0690595 B1 | 2/1999 | | H04L/9/18 |
| EP | 0772843 B1 | 5/1999 | | G06K/19/18 |
| GB | 2 196 167 A | * 4/1988 | | G11B/20/08 |
| JP | 4-248771 A | 9/1992 | | H04N/1/44 |
| WO | WO 95/10813 A1 | 4/1995 | | G06F/15/403 |

OTHER PUBLICATIONS

Onishi et al., "Detection of Watermark from a Clipped Picture Using Wavelet," *ITE Technical Report,* vol. 21, No. 42, Jul. 1997, pp. 1–5.*

Tirkel et al., "Electronic Water Mark", DICTA–93, Macquarie University (Sydney, Australia), pp. 666–673, Dec. 1993.

Cyphertech Systems, Inc., "Broadcast Monitoring Technology," Promotional Brochure, Nov. 1992 (4 pages).

Wasserman, Broadcast Monitoring Technology by Cyphertech Systems Inc. (untitled speech transcript), *Worldwide Symp. on the Impact of Digital Tech. On Copyright & Neighboring Rights* (Cambridge, MA), Apr. 2, 1993 (5 pages).

Andersen, R., "Stretching the Limits of Steganography," *Proc. 1st Int. Workshop on Information Hiding,* May/Jun. 1996, pp. 39–48.

Franz et al., "Computer Based Steganography: How It Works and Why . . . ," *Proc. of First Int'l. Workshop on Information Hiding,* pp. 7–21, May 30–Jun. 1, 1996.

Gale, "Zero–Order Grating Microstructures," *Optical Document Security* (van Renesse, R.L., ed.), Artech House, pp. 187–205, 1994.

Gerzon et al., "A High Rate Buried Data Channel For Audio CD," *Journal of the Audio Engineering Society,* vol. 43 Nos. 1–2 pp. 3–22, Jan./Feb. 1995.

Oomen et al., "A Variable–Bit–Rate Buried Data Channel for Compact Disc," *Journal of the Audio Engineering Soc.,* vol. 43 No. 1–2 pp. 23–28, Jan./Feb. 1995.

Poirson, A., et al., "Appearance of Colored Patterns: Pattern–Color Separability," *J. Opt. Soc. Am.,* vol. 10, No. 12, Dec. 1993, pp. 2458–2470.

Poirson, A., et al., "Pattern–Color Separable Pathways Predict Sensitivity to Simple Colored Patterns," *Vision Res.,* vol. 36, No. 4, 1996, pp. 515–526.

Schell, "The Historical Development of Security Printing: Design and Technology," *Optical Document Security* (van Renesse, R.L., ed.), Artech House, pp. 75–93, 1994.

Spannenburg, "Modulations of Printed Gratings as a Protection Against Copying," *Optical Document Security* (van Renesse, R.L., ed.), Artech House, pp. 127–148, 1994.

Szepanski, W., "A Signal Theoretic Method for Creating Forgery–Proof Documents for Automatic Verification," *Proc. of 1979 Carnahan Conference on Crime Countermeasures,* pp. 101–109, May 16, 1979.

Szepanski, W., "Additive Binary Data Transmission for Video Signals," Presented at Conference of the Communications Engineering Society, Sep. 30, 1980, *NTG Technical Reports,* vol. 74, pp. 343–351.

Szepanski, W., "Binary Data Transmission Over Video Channels with Very Low Amplitude Data Signals," *Fernseh– und Kino Technik,* vol. 32 No. 7 pp. 251–256.

Szepanski, W., "Compatibility Problems in Add–On Data Transmission for TV–Channels," *Second Symp. and Tech. Exh. on Electromagnetic Compatibility,* pp. 263–268, Jun. 28, 1977.

Szepanski, W., "Optimization of Add–On Signals by Means of a Modified Training Algorithm for Linear Classifiers," *IEEE Int'l Symp. On Info. Theory,* pp. 27–28, Oct. 10, 1977.

Watson, A. "Human Vision, Visual Processing, and Digital Display IV—PCT Quantization Matrices Visually Optimizer for Individual Images," Feb. 1993, *Proc. SPIE vol. 1913: Human Vision, Visual Processing and Digital Display IV,* pp. 202–216.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6, 10–12, 15, 17, 19–20 and 22 is confirmed.

Claims 7, 9, 13–14, 16, 18, 21 and 25–27 are determined to be patentable as amended.

Claims 8 and 23–24, dependent on an amended claim, are determined to be patentable.

New claims 28–58 are added and determined to be patentable.

7. In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function;

wherein the multi-bit message code represents at least two fields of information, and the output signal includes audio samples that are steganographically embedded with information from each of the at least two fields.

9. The method of claim 7 in which the local scaling data is also a [finction] *function* of first and second non-unity parameters.

13. A tangible storage medium having an image processed in accordance with the method of claim 1 *and computer executable instructions for performing the method of claim 1* stored thereon.

14. The [nierhod] *method* of claim 1 in which the input image is comprised of plural samples, and the processing includes performing binary addition operations between said samples and overlay data corresponding thereto.

16. The method of claim 3 in which the multi-bit message code comprises at least [thirt] *thirty* two bits.

18. A tangible storage medium having an image processed in accordance with the method of claim [19] *3 and computer executable instructions for performing the method of claim 3* stored thereon.

21. The method of claim 3 in which the multi-bit message code represents at least two fields of information, a first of [s d] *said* fields serving to identify a proprietor of said image, a second of said fields serving to track [par icular] *particular* image data.

25. A tangible storage medium having audio processed in accordance with the method of claim [23] *7 and computer executable instructions for performing the method of claim 7* stored thereon.

26. The method of claim [3] *7* in which the input signal is comprised of plural samples, and the processing includes performing binary addition operations between said samples and overlay data corresponding thereto.

27. [The method of claim 7] *In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function;*
    in which the multi-bit message code represents at least two fields of information, a first of [s ad] *said* fields serving to identify a proprietor of said audio, a second of said fields serving to track particular audio data.

*28. The method of claim 7 wherein at least one of the fields indexes sale information.*

*29. The method of claim 7 wherein at least one of the fields indexes distribution information.*

*30. The method of claim 7 wherein at least one of the fields serves to track particular audio data.*

*31. The method of claim 7 wherein at least one of the fields includes error checking information.*

*32. The method of claim 7 wherein at least one of the fields includes one or more symbols to interpret symbols in another one of the fields.*

*33. In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function;*

*wherein the multi-bit message comprises a plurality of symbols processed by a steganographic embedding operation to distribute the symbols throughout the output signal, the symbols being represented differently at different locations in the output signal as a function of data separate from the audio data.*

*34. The method of claim 33 wherein the separate data comprises pseudo-random data.*

*35. The method of claim 33 wherein the separate data indicates a characteristic of a code signal for modifying the audio data so as to embed the symbols in the audio data.*

36. The method of claim 35 wherein the separate data indicates a polarity of the signal for modifying the audio data.

37. A tangible storage medium having audio processed in accordance with the method of claim 33 and computer executable instructions for performing the method of claim 33 stored thereon.

38. In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function;
  including computing a time domain analysis of time domain samples of the audio data to compute the local scaling data as a non-linear function of time domain audio samples into which corresponding symbols of the multi-bit message are steganographically embedded;
  wherein different symbols in the multi-bit message overlap in time domain samples of the audio signal.

39. In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function;
  wherein the local scaling data varies as a function of audio samples being steganographically embedded with symbols of the multi-bit message and is used along with a second parameter for controlling signal strength of the steganographically embedded data, and wherein the second parameter is applied uniformly across a block of the audio data;
  wherein the second parameter is user-adjustable to control signal strength of the steganographically embedded message.

40. In an audio processing method that includes steganographically encoding an input signal to embed a multi-bit message code therein, the input signal including a plurality of audio data, the method including processing said input signal in accordance with said multi-bit message code to produce an output signal having the message code steganographically encoded therein, an improvement including: encoding the message code throughout the output signal so that the message code can be recovered from first and second non-overlapping excerpts of the output signal, said encoding including changing a plurality of said audio data in accordance with said multi-bit message code, and also in accordance with local scaling data to control the amplitude of the multi-bit message code at different locations in the audio data, said local scaling data being computed from said audio data using a non-linear function;
  wherein the local scaling data is used to generate a signal for modifying the audio data to steganographically embed the multi-bit message in the audio data, and different signs of a characteristic of the output signal convey different message information of the multi-bit message.

41. The method of claim 40 wherein a positive sign conveys a first binary value, and a negative sign conveys a second binary value.

42. The method of claim 40 wherein message symbols of the multi-bit message are distributed throughout the output signal, and each message symbol corresponds to sign data of characteristics distributed throughout the output signal.

43. A tangible storage medium having audio processed in accordance with the method of claim 40 and computer executable instructions for performing the method of claim 40 stored thereon.

44. A tangible storage medium having an image processed in accordance with the method of claim 1 stored thereon, wherein the multi-bit message code is operable to control equipment; and
  wherein the message code is encoded throughout the output image on the storage medium so that the message code can be recovered from first and second non-overlapping excerpts of the output image; and the output image represents a given bit of the encoded message code differently, both in absolute and percentage terms, in said first and second excerpts to reduce image degradation and increase message security; wherein subtraction of the input two-dimensional image from the output image yields a difference frame comprised of difference values, said difference frame having a snow-like appearance in which at least half of said difference values have non-zero values.

45. A tangible storage medium having an image processed in accordance with the method of claim 3 stored thereon, wherein the multi-bit message code is operable to control equipment; and
  wherein the message code is encoded throughout the output signal so that the message code can be recovered from first and second non-overlapping excerpts of the output signal, and a plurality of said picture data is changed in accordance with said multi-bit message code, and also in accordance with local scaling data to control the amplitude of the multi-bit message code at different locations in the image, said local scaling data being a non-linear function of said picture data.

46. A tangible storage medium having audio processed in accordance with the method of claim 7 stored thereon, wherein the multi-bit message code is operable to control equipment; and
  wherein the message code is encoded throughout the output signal so that the message code can be recovered from first and second non-overlapping excerpts of the output signal, a plurality of said audio data is changed in accordance with said multi-bit message code, and also in accordance with local scaling data to control the amplitude of the multi-bit message code at different locations in the audio data, said local scaling data being a non-linear function of said audio data;
  wherein the multi-bit message code represents at least two fields of information, and the output signal includes audio samples that are steganographically embedded with information from each of the at least two fields.

47. A tangible storage medium having audio processed in accordance with the method of claim 33 stored thereon, wherein the multi-bit message code is operable to control equipment; and wherein the message code is encoded throughout the output signal so that the message code can be recovered from first and second non-overlapping excerpts of the output signal, a plurality of said audio data is changed in accordance with said multi-bit message code, and also in accordance with local scaling data to control the amplitude of the multi-bit message code at different locations in the audio data, said local scaling data being a non-linear function of said audio data; and wherein the multi-bit message comprises a plurality of symbols processed by a steganographic embedding operation to distribute the symbols throughout the output signal, the symbols being represented differently at different locations in the output signal as a function of data separate from the audio data.

48. A tangible storage medium having audio processed in accordance with the method of claim 40 stored thereon, wherein the multi-bit message code is operable to control equipment; and wherein the message code is encoded throughout the output signal so that the message code can be recovered from first and second non-overlapping excerpts of the output signal, a plurality of said audio data is changed in accordance with said multi-bit message code, and also in accordance with local scaling data to control the amplitude of the multi-bit message code at different locations in the audio data, said local scaling data being a non-linear function of said audio data; and wherein the local scaling data is used to generate a signal for modifying the audio data to steganographically embed the multi-bit message in the audio data, and different signs of a characteristic of the output signal convey different message information of the multi-bit message.

49. A tangible storage medium having an image processed in accordance with the method of claim 1 stored thereon, and wherein the message code is encoded throughout the output image on the storage medium so that the message code can be recovered from first and second non-overlapping excerpts of the output image; and the output image represents a given bit of the encoded message code differently, both in absolute and percentage terms, in said first and second excerpts to reduce image degradation and increase message security; wherein subtraction of the input two-dimensional image from the output image yields a difference frame comprised of difference values, said difference frame having a snow-like appearance in which at least half of said difference values have non-zero values.

50. A tangible storage medium having an image processed in accordance with the method of claim 3 stored thereon, and wherein the message code is encoded throughout the output signal so that the message code can be recovered from first and second non-overlapping excerpts of the output signal, and a plurality of said picture data is changed in accordance with said multi-bit message code, and also in accordance with local scaling data to control the amplitude of the multi-bit message code at different locations in the image, said local scaling data being a non-linear function of said picture data.

51. A tangible storage medium having audio processed in accordance with the method of claim 7 stored thereon; and wherein the message code is encoded throughout the output signal so that the message code can be recovered from first and second non-overlapping excerpts of the output signal, a plurality of said audio data is changed in accordance with said multi-bit message code, and also in accordance with local scaling data to control the amplitude of the multi-bit message code at different locations in the audio data, said local scaling data being a non-linear function of said audio data;

wherein the multi-bit message code represents at least two fields of information, and the output signal includes audio samples that are steganographically embedded with information from each of the at least two fields.

52. A tangible storage medium having audio processed in accordance with the method of claim 33 stored thereon, and wherein the message code is encoded throughout the output signal so that the message code can be recovered from first and second non-overlapping excerpts of the output signal, a plurality of said audio data is changed in accordance with said multi-bit message code, and also in accordance with local scaling data to control the amplitude of the multi-bit message code at different locations in the audio data, said local scaling data being a non-linear function of said audio data; and wherein the multi-bit message comprises a plurality of symbols processed by a steganographic embedding operation to distribute the symbols throughout the output signal, the symbols being represented differently at different locations in the output signal as a function of data separate from the audio data.

53. A tangible storage medium having audio processed in accordance with the method of claim 40 stored thereon, and wherein the message code is encoded throughout the output signal so that the message code can be recovered from first and second non-overlapping excerpts of the output signal, a plurality of said audio data is changed in accordance with said multi-bit message code, and also in accordance with local scaling data to control the amplitude of the multi-bit message code at different locations in the audio data, said local scaling data being a non-linear function of said audio data; and wherein the local scaling data is used to generate a signal for modifying the audio data to steganographically embed the multi-bit message in the audio data, and different signs of a characteristic of the output signal convey different message information of the multi-bit message.

54. A tangible storage medium having an image processed in accordance with the method of claim 1 stored thereon.

55. A tangible storage medium having an image processed in accordance with the method of claim 3 stored thereon.

56. A tangible storage medium having audio processed in accordance with the method of claim 7 stored thereon.

57. A tangible storage medium having audio processed in accordance with the method of claim 33 stored thereon.

58. A tangible storage medium having audio processed in accordance with the method of claim 40 stored thereon.

* * * * *